(12) United States Patent
Weiss et al.

(10) Patent No.: US 11,136,262 B2
(45) Date of Patent: Oct. 5, 2021

(54) FITOUT ARTICLES AND ARTICLES OF EQUIPMENT FOR KITCHENS OR LABORATORIES WITH A DISPLAY DEVICE

(71) Applicant: SCHOTT AG, Mainz (DE)

(72) Inventors: Evelin Weiss, Mainz (DE); Matthias Bockmeyer, Mainz (DE); Birgit Dörk, Mainz (DE); Friedrich Siebers, Nierstein (DE); Christian Henn, Frei-Laubersheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/228,884

(22) Filed: Dec. 21, 2018

(65) Prior Publication Data

US 2019/0194061 A1 Jun. 27, 2019

(30) Foreign Application Priority Data

Dec. 22, 2017 (DE) .......................... 102017131065.7
May 7, 2018 (DE) .......................... 102018110897.4

(51) Int. Cl.
*C03C 10/00* (2006.01)
*C03C 4/10* (2006.01)
(Continued)

(52) U.S. Cl.
CPC ........ *C03C 10/0027* (2013.01); *C03B 27/012* (2013.01); *C03C 3/087* (2013.01);
(Continued)

(58) Field of Classification Search
CPC ... C03C 10/00; C03C 10/207; C03B 23/0305; F24C 15/022; F21V 1/00; F21V 1/02; F21V 1/16; F21V 1/20; F21V 1/22
See application file for complete search history.

(56) References Cited

U.S. PATENT DOCUMENTS

| 3,756,798 A | 9/1973 | Ernsberger |
| 3,788,865 A | 1/1974 | Babcock |

(Continued)

FOREIGN PATENT DOCUMENTS

| CN | 1326903 | 12/2001 |
| CN | 1332127 | 1/2002 |

(Continued)

OTHER PUBLICATIONS

D65 "Standard Illuminant Light", Wikipedia, 4 pages.
(Continued)

*Primary Examiner* — Gerald J Sufleta, II
(74) *Attorney, Agent, or Firm* — Ohlandt, Greeley, Ruggiero & Perle, L.L.P.

(57) ABSTRACT

A fitout article or article of equipment for a kitchen or laboratory is provided. The article has a display device, a separating element, and a covering. The covering is on an interior side of the separating element and has a cutout at the separating element. The separating element has a light transmittance of at least 5% and at most 70%. The covering has light transmittance of at most 7% and a colour locus in the CIELAB colour space with coordinates $L^*$ of 20 to 40, $a^*$ of −6 to 6 and $b^*$ of −6 to 6, and the colour locus of D65 standard illuminant light, after passing through the substrate, is within a white region W1 determined in the chromaticity diagram CIExyY-2° by the coordinates:

| White region W1 | |
|---|---|
| x | Y |
| 0.27 | 0.21 |
| 0.22 | 0.25 |

(Continued)

-continued

| White region W1 | |
|---|---|
| x | Y |
| 0.32 | 0.37 |
| 0.45 | 0.45 |
| 0.47 | 0.34 |
| 0.36 | 0.29. |

19 Claims, 2 Drawing Sheets

(51) Int. Cl.
*C03C 3/097* (2006.01)
*C03C 17/23* (2006.01)
*C03C 3/087* (2006.01)
*C03C 4/02* (2006.01)
*C03C 17/22* (2006.01)
*C03B 27/012* (2006.01)
*F24C 15/10* (2006.01)

(52) U.S. Cl.
CPC ............... *C03C 3/097* (2013.01); *C03C 4/02* (2013.01); *C03C 4/10* (2013.01); *C03C 10/0009* (2013.01); *C03C 10/0018* (2013.01); *C03C 17/22* (2013.01); *C03C 17/23* (2013.01); *F24C 15/10* (2013.01); *C03C 2217/228* (2013.01)

(56) References Cited

U.S. PATENT DOCUMENTS

| | | |
|---|---|---|
| 4,140,645 A | 2/1979 | Beall |
| 4,273,586 A | 6/1981 | Flannery |
| 4,285,728 A | 8/1981 | Babcock |
| 4,455,160 A | 6/1984 | Rittler |
| 4,461,839 A | 7/1984 | Rittler |
| 4,526,872 A | 7/1985 | Andrieu |
| 4,835,121 A | 5/1989 | Shibuya |
| 5,010,041 A | 4/1991 | Koyama |
| 5,179,045 A | 1/1993 | Aitken |
| 5,204,293 A | 4/1993 | Amundson, Jr. |
| 5,212,122 A | 5/1993 | Pannhorst |
| 5,256,600 A | 10/1993 | Pfitzenmaier |
| 5,446,008 A | 8/1995 | Krolla |
| 5,491,115 A | 2/1996 | Pfitzenmaier |
| 6,413,906 B1 | 7/2002 | Shimatani |
| 7,473,660 B2 | 1/2009 | Eurokera |
| 8,722,554 B2 | 5/2014 | Comte |
| 8,765,619 B2 | 7/2014 | Brunet |
| 9,018,113 B2 | 4/2015 | Siebers |
| 9,061,937 B2 | 6/2015 | Siebers |
| 9,156,727 B2 | 10/2015 | Siebers |
| 2002/0011481 A1 | 1/2002 | Melson |
| 2002/0023463 A1 | 2/2002 | Siebers |
| 2002/0058117 A1 | 5/2002 | Schultheis |
| 2003/0054935 A1 | 3/2003 | Kitamura |
| 2003/0218001 A1 | 11/2003 | Siebers |
| 2004/0198579 A1 | 10/2004 | Horsfall |
| 2005/0252503 A1 | 11/2005 | Siebers |
| 2005/0255983 A1 | 11/2005 | Becker |
| 2007/0004578 A1 | 1/2007 | Comte |
| 2007/0056961 A1 | 3/2007 | Shimatani |
| 2007/0108184 A1 | 5/2007 | Imamoto |
| 2007/0129231 A1 | 6/2007 | Comte |
| 2007/0232476 A1 | 10/2007 | Siebers |
| 2007/0293386 A1 | 12/2007 | Goto |
| 2008/0026927 A1 | 1/2008 | Comte |
| 2008/0090034 A1 | 4/2008 | Harrison |
| 2008/0139375 A1 | 6/2008 | Wennemann |
| 2008/0184740 A1 | 8/2008 | Waldschmidt |
| 2008/0207424 A1 | 8/2008 | Aitken |
| 2009/0018007 A1 | 1/2009 | Siebers |
| 2009/0109373 A1* | 4/2009 | Taniguchi ............ G02B 6/0061 349/65 |
| 2010/0047556 A1 | 2/2010 | Bockmeyer |
| 2010/0130034 A1 | 5/2010 | Huang |
| 2010/0130341 A1 | 5/2010 | Wondraczek |
| 2010/0157585 A1* | 6/2010 | Diekmann ............... F21S 6/002 362/228 |
| 2010/0304944 A1 | 12/2010 | Comte |
| 2010/0304948 A1 | 12/2010 | Comte |
| 2011/0140843 A1 | 6/2011 | Nireki |
| 2011/0226231 A1 | 9/2011 | Siebers |
| 2012/0067865 A1 | 3/2012 | Siebers |
| 2012/0085336 A1 | 4/2012 | Brunet |
| 2013/0070451 A1 | 3/2013 | Mulet |
| 2013/0098903 A1 | 4/2013 | Di Giovanni |
| 2013/0140293 A1 | 6/2013 | Doerk |
| 2013/0164509 A1 | 6/2013 | Siebers |
| 2013/0178353 A1 | 7/2013 | Comte |
| 2013/0201678 A1 | 8/2013 | Siebers |
| 2013/0286630 A1* | 10/2013 | Guiset ..................... F21V 19/00 362/23.1 |
| 2013/0328946 A1 | 12/2013 | Zenker |
| 2014/0009370 A1* | 1/2014 | Weiss ................... G02B 27/026 345/32 |
| 2014/0146530 A1 | 5/2014 | Guiset |
| 2014/0146538 A1 | 5/2014 | Zenker |
| 2014/0194270 A1 | 7/2014 | Shiratori |
| 2014/0238971 A1 | 8/2014 | Comte |
| 2014/0356608 A1 | 12/2014 | Lentes |
| 2015/0266770 A1 | 9/2015 | Miyasaka |
| 2015/0266771 A1 | 9/2015 | Miyasaka |
| 2015/0274579 A1 | 10/2015 | Plevacova |
| 2016/0031755 A1 | 2/2016 | Hoppe |
| 2016/0168018 A1 | 6/2016 | Gabel |
| 2016/0176752 A1 | 6/2016 | Gabel |
| 2016/0281961 A1* | 9/2016 | Laluet ................ C03C 10/0027 |
| 2016/0334094 A1* | 11/2016 | Bach .......................... F21V 9/40 |
| 2017/0016627 A1* | 1/2017 | Charpentier ............. F24C 15/10 |
| 2017/0023260 A1* | 1/2017 | Charpentier ........ C03C 10/0054 |
| 2017/0052311 A1* | 2/2017 | Lautenschlager .... G02B 6/0043 |
| 2017/0139109 A1* | 5/2017 | Gierens ............. B32B 17/10036 |
| 2017/0205552 A1* | 7/2017 | Gierens ................. G02B 6/0035 |
| 2017/0215236 A1 | 7/2017 | Doerk |
| 2019/0059131 A1* | 2/2019 | Debreyer ................. H05B 3/74 |
| 2019/0062201 A1 | 2/2019 | Weiss |
| 2019/0194060 A1 | 6/2019 | Weiss |
| 2019/0194061 A1 | 6/2019 | Weiss |
| 2019/0194062 A1 | 6/2019 | Woelfinger |
| 2019/0194065 A1 | 6/2019 | Henn |
| 2019/0195510 A1* | 6/2019 | Weiss ..................... C03C 17/23 |
| 2019/0246788 A1* | 8/2019 | Demol ................... F24C 15/10 |
| 2020/0048144 A1* | 2/2020 | Guedon ................. C03C 3/087 |
| 2020/0189965 A1 | 6/2020 | Comte |

FOREIGN PATENT DOCUMENTS

| | | |
|---|---|---|
| CN | 1454189 | 11/2003 |
| CN | 1696072 | 11/2005 |
| CN | 1784363 | 6/2006 |
| CN | 1871179 | 11/2006 |
| CN | 101085699 | 12/2007 |
| DE | 1796298 | 5/1972 |
| DE | 2705948 | 9/1977 |
| DE | 2844030 | 4/1979 |
| DE | 3345316 | 6/1984 |
| DE | 3927174 | 2/1990 |
| DE | 4321373 | 1/1995 |
| DE | 19939787 | 2/2001 |
| DE | 10338165 | 3/2005 |
| DE | 102007036407 | 9/2008 |
| DE | 102008031428 | 1/2010 |
| DE | 102008040097 | 1/2010 |
| DE | 102008050263 | 4/2010 |
| DE | 102009013127 | 9/2010 |

(56) References Cited

FOREIGN PATENT DOCUMENTS

| | | |
|---|---|---|
| DE | 102011050873 | 6/2012 |
| DE | 202011110029 | 10/2012 |
| DE | 102014226986 | 6/2016 |
| DE | 102015103461 | 9/2016 |
| DE | 102016101036 | 7/2017 |
| DE | 102017101114 | 7/2017 |
| DE | 102016103524 | 8/2017 |
| DE | 202018100558 | 2/2018 |
| EP | 0220333 | 5/1987 |
| EP | 1074520 | 2/2001 |
| EP | 1465460 | 10/2004 |
| EP | 1398303 | 11/2005 |
| EP | 1837312 | 9/2007 |
| EP | 2435378 | 7/2014 |
| EP | 2817265 | 12/2014 |
| EP | 3208545 | 8/2017 |
| EP | 3049374 | 11/2017 |
| ES | 2344267 | 11/2015 |
| FR | 3002532 | 8/2014 |
| GB | 1562332 | 3/1980 |
| GB | 2430249 | 2/2009 |
| JP | H0551235 | 3/1993 |
| JP | H11100229 | 4/1999 |
| JP | H11100230 | 4/1999 |
| JP | H11100231 | 4/1999 |
| JP | 2004251615 | 9/2004 |
| JP | 2005063949 | 3/2005 |
| JP | 6086311 | 3/2017 |
| WO | 0216279 | 2/2002 |
| WO | 2010013700 | 2/2010 |
| WO | 2010102859 | 9/2010 |
| WO | 2010137000 | 12/2010 |
| WO | 2011089220 | 7/2011 |
| WO | 2012010278 | 1/2012 |
| WO | 2012076412 | 6/2012 |
| WO | 2012076414 | 6/2012 |
| WO | 2012168011 | 12/2012 |
| WO | 2013124240 | 8/2013 |
| WO | 2014170275 | 10/2014 |
| WO | 2018224556 | 12/2018 |

OTHER PUBLICATIONS

DIN EN 410, "Glass in building—Determination of luminous and solar characteristics of glazing", Apr. 2011, 66 pages.

DIN EN ISO 11664-4 "Colorimetry—Part 4: CIE 1976 L*a*b* Colour space", Jun. 2012, 12 pages.

ASTM D1003-13, "Standard Test Method for Haze and Luminous Transmittance of Transparent Plastics", Nov. 15, 2013, 7 pages.

DIN ISO 7884-8, "Glass—Viscosity and viscometric fixed points—Part 8: Determination of (dilatometric) transformation temperature", Feb. 1998 (formerly DIN 52324).

DIN 52324 (replaced by DIN ISO 7884-8), "Glass—Viscosity and viscometric fixed points—Part 8: Determination of (dilatometric) transformation temperature", Feb. 1998, 7 pages.

ISO 7991, "Glass—Determination of coefficient of mean linear thermal expansion", Dec. 15, 1987, 12 pages.

Glass Ceramic transmission: Schott Nextrema optical properties, Schott North America, Oct. 2017.

Le Bourhis, "Glass Mechanics and Technology", Wiley-VCH GmbH & Co. KGaA, 3 pages.

"Schott Technical Glasses", Schott AG, Mainz, Germany, Oct. 2007, 40 Pages.

* cited by examiner

FITOUT ARTICLES AND ARTICLES OF EQUIPMENT FOR KITCHENS OR LABORATORIES WITH A DISPLAY DEVICE

CROSS REFERENCE TO RELATED APPLICATIONS

This application claims benefit under 35 USC § 119 of German Application 10 2017 131 065.7 filed Dec. 22, 2017 and German Application 10 2018 110 897.4 filed on May 7, 2018, the entire contents of both of which are incorporated herein by reference.

BACKGROUND OF THE INVENTION

1. Field of the Invention

The invention relates to fitout articles or articles of equipment for kitchens or laboratories having a thermally stable glass or glass ceramic substrate and a display device.

2. Description of Related Art

Sheets of glass or glass ceramic are used in various ways in fitout articles and articles of equipment for kitchens and laboratories. According to the requirements, for example, on chemical or thermal stability or the optical properties, different glasses or glass ceramics are selected for this purpose.

For example, sheets of glass or glass ceramic find use as viewing windows in doors of ovens, refrigerators and microwave devices, as cover glass for operating elements of cooking appliances and coffee machines, as worktop for a kitchen cabinet or piece of laboratory furniture, and in the private and professional sphere.

It is ever more frequently the case that articles of this kind additionally have a display device intended, for example, to show information or, in combination with a corresponding input device, to control a state of operation of an electrical component connected thereto.

The prior art discloses, for example, equipping cooking appliances with a liquid-crystal display disposed under a cooking surface of glass ceramic such that the display is visible by a user of the cooking appliance through the glass ceramic. Such a display can show, for example, the state of operation of the cooking appliance.

However, an important demand on the cooking surface is that it obscures the view of the electrical components installed in the interior of the cooking appliance, for example heating elements, in that it has a low transparency. For this purpose, the glass ceramic may be executed in coloured, strongly light-scattering or transparent form in combination with an opaque coating. These three variants differ in particular in the means of colour configuration. The coloured glass ceramics produce an essentially black colour impression; the light-scattering glass ceramics produce an essentially white colour impression. The colour impression of the transparent glass ceramics depends on the choice of coating and thus offers the greatest freedom of configuration.

A coloured material, no matter what kind, is understood to mean any material which, owing to its composition, absorbs transmitted light such that it has a light transmittance of at most 80%. Coloured materials thus contain colouring or absorbing constituents in their composition. These may, for example, be dyes, pigments or other colouring chemical compounds. By contrast, materials are not considered to be coloured when they have an intrinsic light transmittance of more than 80%, but have a colouring, for example coloured, coating on their surface.

Of these three variants, the light-scattering glass ceramics are not suitable for combination with a display device since the scatter worsens the readability of a display device to such an extent that it is no longer suitable for display of information or for control of a state of operation.

Coloured glass ceramics for cooking surfaces generally contain vanadium ions for colouring since these have the special property of absorbing in the visible light region and permitting high transmission in the infrared radiation region. Such colouring by means of $V_2O_5$ is known, for example, from DE 10 2008 050 263 A1. In conjunction with display devices, the problem occurs in such coloured glass ceramics that the transmission characteristics in the visible spectral region are such that there is distortion of the colours shown by the display device by the glass ceramic. One means of correcting this unwanted colour shift is the mounting of a colour compensation filter, but this is associated with additional work. Such colour compensation filters are known from DE 10 2011 050 873 A1.

EP 3 049 374 B1 discloses that transparent uncoloured glass ceramics can be locally darkened by means of a laser process, i.e. via a thermal process. The transmission spectra that result in the darkened region feature a very flat profile. However, this process has multiple disadvantages. For instance, it can be effected economically only over small areas since the laser has to be scanned slowly across the area to be coloured, and if necessary even has to cross it repeatedly. Secondly, the darkening is only to a relatively minor extent, and it is not possible in this way to produce glass ceramics with low light transmittance. Furthermore, the process is reversible, and so the colour does not have sufficient thermal stability.

The same is also true of the transparent glass ceramics with a transparent coating. GB 2430249 B discloses, for example, a sputtered underside coating for a glass ceramic cooktop, which has higher transmission in the red spectral region than in the blue or green and hence behaves similarly to a coloured glass ceramic. In the case of such a coating, it is likewise possible to provide an additional colour compensation filter.

Alternatively, the region in which the display device is to be disposed may be entirely or at least partly cut out of the coating. This has the advantage that the light emitted by the display device passes solely through the transparent glass ceramic and not through the coating and hence does not undergo a shift in colour locus as a result of the coating. However, a disadvantage here is that the display device is likewise clearly visible in the switched-off state, which is undesirable for aesthetic reasons.

Furthermore, coated or coloured glasses that are specifically optimized not to shift the colour locus of light that passes through it are also known from optical applications. Such systems, also known as neutral density filters or grey glasses, are unsuitable for use in kitchens or laboratories owing to inadequate thermal or chemical stability. Particularly mirrored neutral density filters are generally unsuitable for use in kitchens or laboratories since they clearly show even slight stains and scratches and are therefore difficult to clean. Specifically, neutral density filters and grey glasses do not have the transparency in the infrared spectral region needed for use in kitchen appliances.

SUMMARY

It is an object of the invention to provide a fitout article or article of equipment for a kitchen or laboratory having a display device, which overcomes or at least improves the disadvantages that exist in the prior art.

Such a fitout article or article of equipment for a kitchen or laboratory comprises a display device and a separating element, wherein the separating element divides at least sections of an interior of the article from an exterior and comprises a glass or glass ceramic substrate having a coefficient of thermal expansion CTE of −6 to 6 ppm/K in the temperature range between 20° C. and 300° C. The display device is disposed here in the interior of the article such that the light emitted by the display device passes through a section of the separating element and is perceptible by a user in the exterior of the article. A covering means disposed on the side of the separating element facing the interior of the article has a light transmittance of at most 7% and, at least in the region of the display device, has at least one cutout that overlaps with the glass or glass ceramic substrate. The covering means has a colour locus with the coordinates L* of 20 to 40, a* of −6 to 6 and b* of −6 to 6, measured in reflectance with D65 standard illuminant light in front of a black background in transmission through the glass or glass ceramic substrate. The separating element in the region of the cutout has a light transmittance of at least 5% and of at most 70%. In addition, the separating element is characterized in that the colour locus of D65 standard illuminant light, after passing through the glass or glass ceramic substrate of the separating element in the region of the cutout of the covering means, is within a white region W1 determined in the chromaticity diagram CIExyY-2° by the following coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

In the context of the present invention, a fitout article or article of equipment for a kitchen or laboratory is generally understood to mean a piece of kitchen or laboratory furniture or a preferably electrically operated kitchen or laboratory appliance, irrespective of its specific design. Kitchen or laboratory furniture is especially understood to mean cupboards and tables that have a worktop on their top face. Kitchen appliances such as cooking appliances, refrigerators, microwave appliances, grills, baking ovens, steam cookers, toasters or extractor hoods may be designed either for the private or the professional sector. The article may likewise be a separately arranged control panel, by means of which a user can operate one or more appliances actuatable therewith. Appliances of the invention may, for example, be integrable into kitchen or laboratory furniture or be freestanding. The laboratory appliances also include ovens, climate chambers, refrigerators or hotplates.

Such an article comprises a display device to show information by emission of light. The display device may especially take the form of a graphic, selectively actuatable display that preferably comprises colour pixels. Examples of such displays are LCDs and OLED displays. The display device may likewise be a image or video projector that projects light from the interior of the article into the exterior. Display devices may also have a touch-sensitive sensor for operation by a user.

In addition, an article of the invention comprises a separating element that divides at least sections of an interior of the article from an outer region and that comprises a glass or glass ceramic substrate. In the case of a kitchen or laboratory appliance, the separating element may thus be at least part of the housing or, if appropriate, of a door of the appliance. One example of this is a cooking plate that divides the interior of a cooktop in which, apart from a display device, there are heating elements, for example, from the exterior thereof where the user of the cooktop is present. Viewing windows in baking oven or microwave doors are likewise separating elements of the invention. In kitchen or laboratory furniture, such separating elements may constitute at least part of the furniture body or of the front of a door or drawer. More preferably, the separating element is part or even the entire work surface of a piece of kitchen or laboratory furniture.

The separating element, especially the glass or glass ceramic substrate, is not subject to any particular restrictions in terms of its size and may in principle be produced in any dimensions customary in the glass industry. It may have, for example, the typical size of a cooktop with four cooking zones of about 49×56 cm² or smaller. It may likewise have the size of a customary kitchen worktop of about 63×250 cm² or larger. All sizes in between are likewise implementable. More particularly, the separating element may be in any GEN size GEN 1 to GEN 10.5:

| | Length [mm] | Width [mm] |
|---|---|---|
| GEN 1 | 300 | 400 |
| GEN 2 | 370 | 470 |
| GEN 3 | 550 | 650 |
| GEN 3.5 | 600 | 720 |
| GEN 4 | 680 | 880 |
| GEN 4.5 | 730 | 920 |
| GEN 5 | 1100 | 1250-1300 |
| GEN 6 | 1500 | 1800--1850 |
| GEN 7 | 1870 | 2200 |
| GEN 7.5 | 1950 | 2250 |
| GEN 8 | 2160 | 2460 |
| GEN 10 | 2880 | 3130 |
| GEN 10.5 | 2940 | 3370 |

For any form of fitout articles and articles of equipment for kitchens and laboratories, thermal cycling stability and chemical stability are particularly important parameters. Especially for parts of appliances where high temperatures arise in the use thereof, such as cooktops, hotplates, ovens, baking ovens with pyrolysis function, microwaves or grills, particularly high demands are applicable. But it is also necessary for virtually all other areas of a kitchen or laboratory to be thermally stable since there is always the risk that they will come into contact with hot or very cold articles or liquids. In the event of such contact, there is a very rapid change in the temperature in a locally limited region, which leads to stresses in the material which can lead rapidly to destruction particularly in the case of materials that are prone to brittle fracture, such as glass and glass ceramic.

The most effective way of achieving very good thermal stability is in that the glass or glass ceramic substrate has a linear coefficient of thermal expansion CTE, to ISO 7991, between −2.5×10−6/K and 2.5×10−6/K, preferably between −1.5×10−6/K and 1.5×10−6/K, in the temperature range between 20° C. and 300° C., preferably between 20° C. and 700° C. In the case of such a low coefficient of thermal expansion, even large temperature gradients do not lead to the building of stresses in the substrate. This value is achieved, for example, by quartz glass or by lithium aluminium silicate glass ceramics (LAS glass ceramics), for example of the CERAN® brand from SCHOTT AG. The coefficient of thermal expansion between 20° C. and 300° C. is also referred to as CTE α20/300. The coefficient of thermal expansion between 20° C. and 700° C. is also referred to as CTE α20/700.

The higher the CTE of the glass or glass ceramic and the greater the temperature gradients that possibly occur in use, the higher the risk of stress-induced fractures. This can be counteracted in that the glass or glass ceramic is thermally or chemically tempered. Such tempering gives rise to a compressive stress at the surface of the glass that counteracts the thermal stress. Particular preference is given here to thermal tempering for economic reasons. However, for technical reasons, it can be conducted in the case of glasses having a thickness of at least 2 mm and a CTE of at least $3.5 \times 10-6$/K. In addition, the glass transition temperature Tg of the glasses, measured to ISO 7884-8 or DIN 52324, must not exceed a value of about 650° C., particularly in the case of glasses having a CTE between 3.5 and $6 \times 10-6$/K, in order that tempering with conventional tempering ovens can achieve sufficiently high tempering values of more than about 10 MPa.

Glasses having a CTE between 20 and 300° C. of more than $6 \times 10-6$/K are generally, i.e. even in tempered form, unsuitable for use in kitchens and laboratories. The glass or glass ceramic substrate for the article of the invention thus has to have a CTE between 20 and 300° C. of not more than $6 \times 10-6$/K. Glasses having higher CTE, for example soda-lime glass having a CTE of about $9 \times 10-6$/K, can generally be efficiently thermally tempered. Nevertheless, the tempering values achievable are insufficient to be able to compensate for stresses that arise as a result of the great thermal expansion under thermal stress. Both for thermally and chemically tempered glass substrates, it should be noted that the tempering is degraded by stress at high temperatures over prolonged periods. The lower the Tg of the glass, the quicker this degradation proceeds. Therefore, tempered glasses for use in kitchens and laboratories have to have a Tg of at least 500° C., preferably at least 550° C. Thus, preference is given to using glass ceramics having a CTE between 20 and 300° C. of $-2.5$ to $2.5 \times 10-6$/K or glasses having a CTE between 20 and 300° C. of 3.5 to $6 \times 10-6$/K and Tg of 500 to 650° C., especially of 550 to 650° C.

A factor of similarly great importance to thermal stability is the chemical stability of the glass or glass ceramic substrate to acids and alkalis. In laboratories, this is generally advantageous owing to the handling of chemicals; in kitchens, in particular, resistance to cleaning products and food constituents is important. Especially glasses having high proportions of more than 10% by weight based on oxide of alkali metals or alkaline earth metals, for example soda-lime glass, are therefore unsuitable for articles of the invention.

On the separating element side facing the interior of the article is disposed a covering means having a light transmittance of not more than 7%. The covering means is disposed on the side facing the interior, in order that it is protected from outside influences, especially damage by mechanical stresses.

Such a covering means serves to limit the total light transmittance from the interior of the article of the invention into the exterior in the region of the separating element to at most 5% irrespective of the light transmittance of the separating element, in order to prevent a view into the article of the invention. Preferably, the covering means has a light transmittance of at most 1%, preferably at most 0.1%. The maximum value for light transmittance of 5% is found here in the case of a combination of a separating element having a light transmittance of 70% and a covering means having a light transmittance of 7%.

Light transmittance is determined in the wavelength range of 380 nm to 780 nm using D65 standard illuminant light to DIN EN 410. In terms of its value, light transmittance also corresponds to the brightness Y in the CIExyY-2° colour space.

In the region of the display device, the covering means has at least one cutout through which light which is emitted by the display device can pass. The size of the cutout is preferably matched to the size of the display device, or to the light-emitting part of the display device. Alternatively, for example, it is also possible to provide multiple cutouts which form a regular or irregular pattern, for example, in which case the total size of the pattern is preferably matched to the size of the display device. The purpose of the cutout is thus that the light emitted by the display device is not absorbed by the covering means but can pass through the glass or glass ceramic substrate.

The covering means may be a coating, a self-supporting carrier material, for example a plate or film of glass, glass ceramic, plastic or insulation materials, which may contain, for example, sheet silicates such as mica or fibrous materials. It may also be a combination of these, for example a coated plastics film or a glass-plastic laminate.

The covering means has a colour locus having the coordinates $L^*$ of 20 to 40, $a^*$ of $-6$ to 6 and $b^*$ of $-6$ to 6. Preferably, the covering means has a colour locus in the CIELAB colour space with $L^*$ not more than 35, more preferably not more than 30, most preferably not more than 28, and not less than 22, preferably not less than 25, with $a^*$ of $-4$ to $+4$, preferably of $-2$ to 2, more preferably of $-1$ to 1, and with $b^*$ of $-4$ to $+4$, preferably of $-2$ to 2, more preferably of $-1$ to 1, measured in reflectance. This colour locus is generally perceived by observers as black or at least as dark, which is preferable for fitout articles and articles of equipment for aesthetic reasons. Colour loci having an $L^*$ of more than 40 have too light an appearance to be perceived as black. Colour loci having a magnitude of $|a^*|$ greater than 6 and/or a magnitude of $|b^*|$ greater than 6 are clearly perceived as coloured and not as black. The smaller the values of $L^*$, $|a^*|$ and $|b^*|$, the darker and less chromatic the perception of the shade.

Covering means having an $L^*$ of less than 40 and especially of less than 35, 30 or even 28 additionally have the advantage over those having a higher $L^*$ value that they reflect less light overall by comparison. As a result, the light from display devices mounted in the interior of an article of the invention can be better perceived by an observer in the exterior since the contrast, i.e. the ratio between transmitted brightness of the display device to reflected brightness of the ambient light, is greater. This is advantageous particularly in typical installation situations of fitout articles and articles of equipment with bright ambient lighting, as is typically the case, for example, in the case of workplace lighting in kitchens and laboratories. In this way, it is also possible to improve user comfort and user safety of such an article. This is advantageous especially in comparison with sputtered metallic layers as covering means, for example of titanium or silicon, which typically have an $L^*$ value of more than 70.

These colour coordinates are measured by placing the glass or glass ceramic substrate together with the covering means onto a black trap such that the covering means is disposed on the black trap side and the substrate on the measuring instrument side. Then the colour locus is measured in reflectance with a commercial colorimeter, for example the Konica Minolta CM-700d spectrophotometer, using D65 standard illuminant, a 100 standard observer. The black trap used may, for example, be the CM-A511 black glass tile from Konica Minolta. In this context, the expression "measurement against a black trap" means that the sample to be measured is disposed between the measuring instrument and a black trap.

Covering means in the form of coatings may be produced, for example, on the basis of enamel, sol-gel materials or coloured silicones. Enamel-based coatings suitable for kitchen appliances are known, for example, from DE 10 2015 103 461 A1. One disclosure therein is that use of a glass flux based on the LAS material system, with addition of spinel-based pigments, for example, $Co(Cr,Fe)_2O_4$ or $(Mn,Fe)_2O_3$, can achieve colour loci such as $L*=25$, $a*=0$ and $b*=-0.5$ or $L*=27$, $a*=2$ and $b*=1$. The pigments and the amount thereof in the coating composition can be selected such that, for the intended layer thickness of the coating, light transmittance is less than 7%. If appropriate, the light transmittance can also be reduced by multilayer coating.

DE 10 2008 031 428 A1 discloses sol-gel-based coatings that are suitable for kitchen appliances and have a colour locus that can be established within the range of $30<L*<85$, $-8<a*<8$ and $-8<b*<8$. For this purpose, a mixture of tetraethoxyorthosilane (TEOS) and triethoxymethylsilane (TEMS) is prepared, wherein alcohol may be added as solvent. An aqueous metal oxide dispersion, especially an $SiO_2$ dispersion in the form of colloidally dispersed $SiO_2$ particles, is mixed with acid, preferably hydrochloric acid. The two separately prepared mixtures can be stirred for improved homogenization. Subsequently, the two mixtures are combined and mixed. Advantageously, it is possible to mature this mixture, preferably with constant stirring, for one hour for example. Parallel to the making-up of this mixture, it is possible to weigh out pigments and optionally further fillers, preferably fumed silica, add them to the maturing mixture and disperse them therein. For black layers, a pigment mixture with 67% by weight of coated pigments in platelet form and 33% by weight of fine pulverulent graphite is used.

This choice of colour locus of the covering means is also advantageous because commercial LCDs and OLED displays, when viewed directly, i.e. without an additional substrate or the like, and with an otherwise identical test method, have a similar colour locus. Thus, if a covering means having the above-described colour locus and a display device, for example having a colour locus with the coordinates $L*$ between 25 and 45, $a*$ between $-4$ and 0 and $b*$ between $-2$ and 3, are combined, the display, when viewed through the glass or glass ceramic substrate of the separating element, even in the case of high transmittances of the separating element to 70%, will be barely visually distinguishable from an adjoining covering means.

The separating element in the region of the covering means has a light transmittance of at least 5% and of at most 70%. Preferably, the separating element in the region of the cutout has a light transmittance of at least 9%, more preferably at least 15%, even more preferably at least 20%, and of at most 55%, more preferably at most 45% and even more preferably at most 40%. The light transmittance may thus lie, for example, within one of the following ranges: 5-70%, 5-55%, 5-45%, 5-40%, 9-70%, 9-55%, 9-45%, 9-40%, 15-70%, 15-55%, 15-45%, 15-40%, 20-70%, 20-55%, 20-45% or 20-40%.

A minimum transmittance of 5% is required in order that, with use of conventional display devices, the light from the display device is clearly perceptible in the exterior. According to the brightness of the environment, the luminance of the display device in the exterior should be approximately between 100 and 200 cd/m2, in order to assure good perceptibility. In the case of a light transmittance of the separating element of 5%, for example, a display device having a luminance of 2000 cd/m2 is necessary in order to produce a luminance of 100 cd/m$^2$ in the exterior. In the case of a light transmittance of 70%, even a display device having a luminance of about 140 cd/m$^2$ is sufficient in order to achieve about 100 cd/m$^2$ in the exterior. A higher light transmittance of the separating element in the region of the display device has a positive effect on the energy efficiency of the system since a display device can be operated at lower luminance and hence lower energy consumption. Apart from that, display devices with lower maximum luminance are also less expensive to procure. At a light transmittance of more than 70%, both the covering means and the display device in the switched-off state are clearly visible through the glass or glass ceramic substrate, such that even slight colour differences between covering means and display device are clearly perceptible.

The light transmittance of the separating element in the region of the cutout of the covering means can be adjusted in two ways. Firstly, the glass or glass ceramic substrate can be coloured. At first, all known colorants are suitable for this purpose, provided that the colour locus of the covering means measured through the substrate is within the abovementioned range. The light transmittance can be adjusted here by means of the amount of colorant. Secondly, the glass or glass ceramic substrate can be provided with an absorbing coating. In the case of coatings, light transmittance can be influenced, for example, by means of the layer thickness. Here too, the colour locus of the covering means, measured in transparency through the coated substrate, must be within the abovementioned range. It is also conceivable to provide a coloured glass additionally with an absorbing coating.

In addition, the separating element is characterized in that the colour locus of D65 standard illuminant light, after passing through the glass or glass ceramic substrate of the separating element in the region of the cutout of the covering means, is within a white region W1 determined in the chromaticity diagram CIExyY-2° by the following coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

The white region W1 is determined here as a region along the black-body curve in the CIExyY colour space that ranges from colour temperature about 2750 K to about 1 000 000 K (=1 MK) and is shifted upward at the upper limit by a value of about y=0.04 relative to the black-body curve and downward at the lower limit by about y=0.07. This results in the following effect: by definition, D65 standard illuminant light has a colour temperature of about 6500 K and, when observed directly by a 2° observer, a colour locus of x=0.31 and y=0.33. By the present invention, it is thus possible, on passage of light through the separating element, to shift the colour locus of the light essentially along the black body curves, either to higher or to lower colour temperatures, i.e. without producing an unwanted tint. White light after passing through is thus still perceived as white light.

The colour locus of light after passage through the substrate can be measured, for example, with the Konica Minolta CS-150 colorimeter. It is likewise possible to measure the transmission spectrum of the substrate and to use this, with the aid of the known spectrum of D65 standard light and the eye sensitivity of a 20 normal observer in accordance with specifications of the CIE, to calculate the colour locus.

Display devices such as displays are typically adjusted, for example, such that they emit white light having a colour temperature of 5000 K, 6500 K or 9300 K. The article of the invention thus enables, with commercial displays without any need for further adjustments, production of a colour locus desired for displays in the light emitted by the display in the outer region of the article.

In a preferred embodiment, the separating element is characterized in that the colour locus of D65 standard illuminant light, after passing through the glass or glass ceramic substrate of the separating element in the region of the cutout of the covering means, is within a white region W2 determined in the chromaticity diagram CIExyY-2° by the following coordinates:

| White region W2 | |
|---|---|
| x | y |
| 0.25 | 0.27 |
| 0.32 | 0.36 |
| 0.41 | 0.42 |
| 0.42 | 0.36 |
| 0.35 | 0.31 |
| 0.27 | 0.24 |

The white region W2 is determined here as a region along the black-body curve in the CIExyY colour space that ranges from colour temperature about 3500 K to about 20 000 K and is shifted upward at the upper limit by a value of about y=0.025 relative to the black-body curve and downward at the lower limit by about y=0.04. By comparison with W1, this region thus extends along a shorter section of the black-body curve and has a smaller deviation in the x and y coordinates from the black-body curve.

This section of the black-body curve from about 3500 K to about 20 000 K corresponds to the colour loci that can be covered by natural sunlight. Evening sunlight shortly before the commencement of dusk corresponds to a black-body radiator at about 3500 K; a clear sky at midday corresponds to a black-body radiator at about 20 000 K. Colour loci at or close to the black-body curve, particularly in this region, are therefore perceived as white and particularly natural.

More preferably, the separating element is characterized in that the colour locus of D65 standard illuminant light, after passing through the glass or glass ceramic substrate of the separating element in the region of the cutout of the covering means, is within a white region W3 that extends along the black-body curve in the CIExyY colour space from colour temperature of about 5000 K to about 20 000 K and is shifted upward at the upper limit by a value of about y=0.025 relative to the black-body curve and downward at the lower limit by about y=0.04. The white region W3 thus corresponds essentially to region W2, but begins only at a colour temperature of 5000 K. This colour region corresponds to daylight white and is correspondingly perceived by the human observer as particularly pure white, especially as cold white:

| White region W3 | |
|---|---|
| x | y |
| 0.250 | 0.270 |
| 0.290 | 0.320 |
| 0.340 | 0.370 |
| 0.360 | 0.320 |
| 0.310 | 0.280 |
| 0.270 | 0.240 |

This is surprisingly possible by the present invention even without the use of a black-body compensation filter to compensate for the transmission profile of the separating element. In the context of the present invention, a black-body compensation filter is understood to mean an optical filter having a transmission spectrum matched to the transmission spectrum of the separating element such that D65 standard illuminant light, after passing through the black-body compensation filter and the separating element, has a colour locus with coordinates within the white region W1 or if appropriate W2.

According to the invention, such a filter is unnecessary since D65 standard illuminant light, after passing through the separating element, already has a colour locus in this region. Such a filter may optionally nevertheless be disposed between the separating element and a display device, for example when different regions of the separating element for transmitted D65 illuminant light are to produce different colour loci within the region W1 or W2.

Black-body compensation filters may take the form, for example, of printed-on, applied or correspondingly arranged layers, films or sheets. Other colour compensation filters are also conceivable, for example in order to give white light emitted in the interior of the article a coloured appearance to an observer in the exterior, for example an appearance with a blue, red, green or any other colour.

Separating elements that fulfil the abovementioned requirement comprise, for example, novel glass ceramic substrates that consist of a transparent coloured LAS glass ceramic and comprise, as colouring components, 0.003-0.5% by weight of $MoO_3$, less than 0.2% by weight of $Nd_2O_3$ and less than 0.015% by weight of $V_2O_5$.

These novel glass ceramics, which are distinctly more colour-neutral compared to the prior art, owing to their transmission characteristics, offer great advantages in modular assembly, for example in the case of the cooktops of modular construction that are customary on the market and likewise in combination with other glassed appliances, for example baking ovens with colour-neutral front glass panels or glass-fronted refrigerators.

The transparent coloured glass ceramics differ here from the transparent non-coloured glass ceramics in that transmission is lowered via the controlled addition of one or more colouring compounds that absorb in the visible. These colouring compounds as a constituent of the composition of a coloured glass ceramic thus increase the coefficient of absorption of the glass ceramic by comparison with a non-coloured glass ceramic. The resulting spectral progression of the transmission curve for a defined thickness gives rise to the colour of the glass ceramic and the brightness thereof.

Also used synonymously in the literature with the term "coloured glass ceramic" is the term "volume-coloured glass ceramic". Both terms emphasize the fact that the glass ceramic contains colouring constituents in its composition that affect the coefficient of absorption of the glass ceramic. Thus, these materials differ fundamentally from non-coloured glass ceramics that have a coloured coating for colouring of an article produced therefrom. Such a coating has no effect at all on the coefficient of absorption of the glass ceramic.

A minimum content of 0.003% by weight of MoO3 is required in the case of these preferred glass ceramics in order to obtain the desired colour effect. If lower light transmission is desired, higher MoO3 contents are required. Equally, in the case of increasing Fe2O3 or V2O5 contents, higher MoO3 contents are required since both Fe2O3 and V2O5 alter the transmission characteristics of the glass ceramic such that the colour locus of D65 standard illuminant light after passing through the glass ceramic is shifted away from the black-body curve, especially toward red hues. Preferably, for establishment of the colour effect, at least 0.01%, further preferably at least 0.03% and more preferably at least 0.05% by weight of MoO3 is present. Since different valences of the Mo atom are present in the glass ceramic, the stated contents of the composition are based analytically on this compound. As the upper limit, the MoO3 content is preferably 0.3%, further preferably 0.25% and more preferably 0.2% by weight.

With a content of 0.003-0.5% by weight of MoO3, it is possible to adjust the light transmittance of a glass ceramic substrate of thickness 2 to 8 mm to a value of 5% to 70%.

It has been found that the addition of MoO3 brings about lowering of the glass viscosity and is favourable for the fusibility and refining of the glass. However, particularly the reduced molybdenum oxide species also act as nucleating agents and can worsen the devitrification stability. It is therefore advantageous to limit the content.

These glass ceramics contain less than 0.2% by weight of Nd2O3 since, in the case of this colour oxide, the colour effect arises via narrow absorption bands in the region of 526, 584 and 748 nm. Light in these wavelength ranges is more strongly absorbed by the glass ceramic on passage. The preferred Nd2O3 content is less than 0.06% by weight. More preferably, no Nd2O3 is used in the glass ceramic, and the glass ceramic is free of Nd2O3 for technical purposes. In that case, generally less than 10 ppm of impurities is present.

Particularly the V2O5 component moves the colour locus of transmitted D65 illuminant light to higher x values in the CIE colour system, i.e. into the orange-red. The component is suitable for combination colouring with MoO3. However, V2O5 colours more intensely, and so the content has to be limited in order to achieve the colour effect of the invention. Higher contents than 0.015% by weight are therefore unfavourable. Preferably, the V2O5 content is less than 0.01% by weight and further preferably not more than 0.005% by weight. More preferably, no V2O5 is added to the composition and only impurities of a few ppm, usually 1-15 ppm, are present in the glass ceramic. The molybdenum oxide is thus the main colourant, and the following component relationship is applicable: MoO3/V2O5>1, preferably >3, more preferably >5.

A preferred composition of such a glass ceramic that meets the abovementioned demands, in % by weight based on oxide, consists essentially of:

| | |
|---|---|
| Li$_2$O | 2.5-5.5 |
| Σ Na$_2$O + K$_2$O | 0.1-<4 |
| MgO | 0-3 |
| Σ CaO + SrO + BaO | 0-5 |
| ZnO | 0-4 |
| B$_2$O$_3$ | 0-3 |
| Al$_2$O$_3$ | 16-26 |
| SiO$_2$ | 58-72 |
| TiO$_2$ | 1.5-5.5 |
| ZrO$_2$ | 0-2.5 |
| SnO$_2$ | 0.1-<0.7 |
| Σ TiO$_2$ + ZrO$_2$ + SnO$_2$ | 3-6.5 |
| P$_2$O$_5$ | 0-5 |
| MoO$_3$ | 0.003-0.5 |
| Fe$_2$O$_3$ | 0-0.025 |
| V$_2$O$_5$ | 0-0.015 |
| Nd$_2$O$_3$ | 0-<0.02 |

The term "consists essentially of" means that the components listed are to make up at least 96%, generally at least 98%, of the overall composition. These glass ceramics optionally contain additions of chemical refining agents such as As2O3, Sb2O3, CeO2, and of refining additions such as manganese oxide, sulfate compounds, halide compounds (F, Cl, Br) in total contents up to 2.0% by weight.

For reasons of cost, particularly advantageously, the Li2O content should be chosen at a minimum. However, a reduction in the Li2O content brings about an increase in thermal expansion, and so the amount of Li2O has to be chosen appropriately according to the application requirements. Preferably, such a glass ceramic contains between 2.5% and 5.0% by weight or between 2.7% and 4.5% by weight or between 2.9% and 4.0% by weight or between 3.0% and 3.5% by weight of Li2O.

Compounds of a multitude of elements, for example the alkalis Rb, Cs, or elements such as Mn, Hf are customary impurities in batch raw materials used on the industrial scale. Other compounds, for example those of the elements W, Nb, Ta, Y, rare earths, Bi, V, Cr, Ni, may likewise be present as an impurity in batch raw materials used on the industrial scale, typically in the ppm range.

For reasons of environmental protection and occupational hygiene, the use of raw materials that are toxic or a matter of concern is avoided if possible. Therefore, the glass ceramic is preferably free of substances harmful to the environment, such as arsenic (As), antimony (Sb), cadmium (Cd), lead (Pb), caesium (Cs), rubidium (Rb), halides and sulfur (S), apart from unavoidable impurities in the range of preferably 0 to less than 0.5 percent by weight, more preferably less than 0.1 percent by weight, most preferably less than 0.05 percent by weight. The figures in % by weight relate here to the glass composition based on oxide.

In general, either naturally occurring raw materials or chemically processed or synthetically produced raw materials can be used for the production. Naturally occurring raw materials are generally less costly than equivalent chemically processed or synthesized raw materials. However, the usability of natural raw materials is limited by the typically high amounts of impurities. Examples of naturally occurring raw materials are quartz sand, spodumene and petalite. Chemically processed or synthetically produced raw materials generally contain only a very low level of impurities. Examples of commonly used processed or synthesized raw materials are lithium carbonate or titanium dioxide powder.

The impurities through typical trace elements in the technical raw materials used are typically 200 ppm B2O3, 30 ppm Cl, 1 ppm CoO, 3 ppm Cr2O3, 200 ppm Cs2O, 3 ppm CuO, 200 ppm F, 400 ppm HfO2, 3 ppm NiO, 500 ppm Rb2O, 5 ppm V2O5.

As an alternative to such a transparent glass ceramic substrate coloured by means of molybdenum oxide as main colorant, the separating element may also comprise a transparent non-coloured thermally stable substrate made of glass or glass ceramic with a coating having appropriate optical properties.

In this case, useful layers for an article of the invention are solely those that have a colour locus with L* of 20 to 40, a* of −6 to 6 and b* of −6 to 6, measured in reflectance with D65 standard illuminant light against a black trap in transmission through the glass or glass ceramic substrate, As a result, light-coloured layers in particular, i.e. highly reflective, chromatic and metallic mirror layers, are ruled out.

At the same time, the light transmittance of the layers has to be set within a range of 5% to 70%, measured in transmission through the layer and the substrate.

This means that transparent layer systems, for example multiple layers of oxides, nitrides and/or oxynitrides, are ruled out. With such interference optics layer systems, it is possible to adjust the a* and b* components of the colour locus in reflectance in a controlled manner, but it is not simultaneously possible to establish a low light transmittance of 5% to 70% and low brightness in reflectance, i.e. an L* value between 20 and 40. In the case of such systems, for lack of absorbing materials, it is possible to choose only between high transmission at low reflection, for example anti-reflection layers, and low transmission at high reflectance, for example dichroitic mirrors. Low transmission with simultaneously low reflectance is not achievable.

Apart from these, multilayer layer systems, especially for interference optics, are not suitable merely for reasons of cost for fitout articles and articles of equipment for kitchens and laboratories.

These demands are surprisingly met by novel layers based on spinels, cermets, carbides or carbonitrides.

Spinels are known from mineralogy and from ceramic solids. The inventors have found that oxidic spinels, surprisingly, as an alloy in reactively sputtered form from a metallic target with substoichiometric addition of oxygen, have a very low L* value of less than 35. In this way, it is possible in principle to produce dark hues with simultaneously low electrical conductivity. The transmission profile of such layers is also flat, and so D65 standard illuminant light, after passing through such a coating, is within the white region W1.

In the wavelength range of 780 nm to about 4500 nm, coatings of spinels have high spectral transmittances of more than 30% or even more than 50%, up to more than 80%. Essentially, spectral transmittance in the infrared spectral region in the case of cover plates with spinel coatings is limited not by the coating but by the substrate used. Uncoloured transparent LAS glass ceramics, for example the CERAN CLEARTRANS® brand from SCHOTT AG, with a spinel coating at a wavelength of about 3750 nm have a spectral transmittance of more than 40%. Such coatings are thus especially suitable for use as radiation heating elements or infrared sensors behind or under the separating element. Sheet resistances are more than 1 MΩ/□ at a test voltage of 1000 V. Thus, these layers are also suitable for use with capacitive and inductive sensors and induction coils for energy transmission, for example induction heating elements.

Suitable spinels have a composition of the formula $A_xCuB_yD_vE_zF_w$ where A and C are selected from the group consisting of Cr2+; Mn2+, Fe2+, Co2+, Ni2+, Cu2+, Zn2+; Al3+, Sn2+/4+, Ti4+, Zr4+, or the lanthanides and mixtures thereof. B and D are selected from the group consisting of Mn3+, Fe3+, Co3+, Ni3+, Cu3+, Al3+, Ga3+, Sn4+, Sc3+, Ti4+, Zn2+, or the lanthanides and mixtures thereof. E and F are preferably selected from the group consisting of the divalent anions of S, Se and O and mixtures thereof. The values of x, u, y, v, z and w satisfy the following formulae:

$$0.125 < (x+u)/(y+v) \leq 0.55 \text{ and}$$

$$z+w=4.$$

Preferably, the coating includes crystallites, where at least 95% by weight of the crystallites show symmetric cubic crystal structures of the spinel type.

In order to improve colour neutrality, it is possible to modify the layer system by means of a compensation layer disposed between the substrate and the spinel coating. The L* in reflectance is virtually unaffected thereby. Compensation layers may be materials that have their refractive indices between substrate and spinel coating in the visible spectrum, e.g. CeO2, HfO2, Y2O3, Si3N4, AlN, SiO2, Al2O3, AlTiOx, TiSiOx, SiOxNy, AlSiOxNy. It is also possible to use substoichiometric variants as compensation layer. The layer thickness of such compensation layers is preferably in the range of 25 to 500 nm, more preferably 35 to 250 nm. Surprisingly, such a compensation layer changes only the colour locus of the coating in reflectance, and not the transmission characteristics. Thus, such a compensation layer more particularly does not act as a black-body compensation filter.

In a preferred embodiment, the coating consists of a spinel composed of one of the following material systems: aluminium spinels, chromium spinels, iron spinels, titanium spinels, cobalt spinels. More preferably, the coating consists of CoFeMnCr spinel and optionally has a compensation layer of SiOxNy.

In a further preferred embodiment, the coating consists of a cermet with an oxidic matrix composed of SiO2, Al2O3, ZrO2, TiO2 or mixed oxides thereof and a metallic component composed of Ti, Si, Al, Mo, Zr, Cu, Nb, Co, Cr, W, Ta, Ni, B or an alloy of at least two of these metals. In the context of the present invention, the term "cermets" is understood to mean composite materials composed of an oxidic matrix with a metallic component dispersed therein. Embodiments containing such composite materials are particularly preferred here since they combine the optical properties of the metallic component with the low electrical conductivity of the matrix material and hence are of particularly good suitability for the coating of a cover plate of the invention.

It may be a feature of these cermet layer systems that they have very high sheet resistance, >20 MΩ/□, with adjustable light transmittance of 5-70%. In these transmission regions, it is possible to produce very colour-neutral layers with low L* value. Cermet layer systems, especially at high transmittances >20%, showed colour loci with a* and b* values within a region of +/−2, in specific cases even well below that. The average spectral reflectance of cermet coatings with a light transmittance of 35% may be 5% with a ratio of greatest to smallest value in the visible spectral region of about 1.5. The transmission profile of such layers has been found to be very flat, such that D65 standard illuminant light, after passing through the coating, was in the white region W1 or even in the white region W2. In the infrared spectral range between 780 and 4250 nm, these cermet layer systems have only weak absorption, and so spectral transmittance here too is limited in wide ranges by the substrate and not by the coating. The cermet layers examined, at a wavelength of about 3750 nm, may have a transmittance of more than 40%.

In a preferred embodiment, oxidic matrix and metallic component are matched to one another such that they have elevated thermal stability. Thermal stability can be determined, for example, by measuring the CIELAB colour locus after the sample has been stressed at 380° C. to 80 hours and comparing the measurements with the unstressed sample. A particularly advantageous option here is a material pair of metal having high oxygen affinity for formation of a metal oxide matrix and a metal having lower oxygen affinity for the formation of the metallic component in the cermet.

Particular preference is given to $SiO_2$ or $Al_2O_3$ as the metal oxide matrix in combination with Mo as the metallic component. Si and Al have a higher oxygen affinity than Mo, which means that the formation of $SiO_2$ or $Al_2O_3$ is preferred over Mo oxide. At the same time, in the case of very dense layers, the oxidic matrix acts as oxidation barrier and protects the Mo from oxidation. Mixed oxides, especially composed of $SiO_2$ and $Al_2O_3$, are also suitable for use as metal oxide matrix.

In a preferred embodiment, $SiO_2$ is used for the oxidic matrix. In that case, the ratio of Mo to Si in the coating may be at least 5:95, preferably at least 10:90, more preferably 15:85 and especially 20:80, in % by weight. At the same time, it may preferably be at most 50:50, more preferably at most 45:55, especially preferably at most 40:60 and in particular at most 35:65, in % by weight. The ratio of Mo to Si in the coating may thus, for example, be within a range of 5:95 to 50:50% by weight, 10:90 to 45:55% by weight, 15:85 to 40:60% by weight or even 20:80 to 35:65% by weight. These ratios are determined using the proportions by weight of Mo and Si in the coating. This does not take account of the proportion by weight of oxygen or other constituents of the coating. The person skilled in the art will adjust the proportion of oxygen such that the coating meets the respective demands.

In a particularly preferred embodiment, the coating, apart from Mo, Si, oxygen and unavoidable impurities, does not contain any further constituents.

The use of such $MoSiO_x$ cermets has been found to be particularly advantageous since these have a particularly flat transmission profile and a particularly flat profile of spectral reflectance, and at the same time high electrical resistance and high thermal stability.

For thermal stabilization, cermets, and also spinels, may additionally be provided with an oxidation barrier. These may be, for example: oxides or nitrides or oxynitrides of at least one of the following materials: Si, Al, Ti, Zr, Sn, Cr, Zn, Nb, Y, Ta, Mo, B. Silicon nitride in particular has been found to be a preferred oxidation barrier for cermets, and silicon oxide in particular for spinels. Oxidation barrier layers can also have a positive effect on transmission in the infrared.

The inventors have found that it is surprisingly possible, with coatings composed of carbides and carbonitrides on glass or glass ceramic, to establish low L* values in the region of 30 at a colour locus of $-3<a*<3$, $-3<b*<3$ in reflectance. Furthermore, the layers have an average reflectance of about 4% to 8% and a ratio of maximum to minimum reflectance in the visible spectral region of about 1.5. In the infrared spectral region, these layers even at 950 nm transmit more than 50% and do not have any significant absorption in the range of about 1250 nm to at least 4000 nm, and so the spectral transmission of a cover plate in this range is limited by the substrate.

These layer systems may be produced as individual layers or as a layer system with the compensation layers already described for spinels between substrate and coating and/or with additional oxidation barriers. The person skilled in the art will select here, from the materials described above, a combination with appropriate refractive index between that of the substrate and that of the coating, and an appropriate layer thickness. In the case of use of layers based on carbides or carbonitrides, preferably at least one of the following materials is present in the coating: Si, Zr, W, Ti, Mo, Cr, B, DLC.

All the layer systems mentioned are preferably produced by means of magnetron sputtering, especially by means of reactive moderate-frequency sputtering or high-frequency sputtering. In reactive moderate-frequency sputtering, it is possible to use metallic targets, for example composed of pure metals or composed of alloys, and to supply oxygen or nitrogen, for example, as reactive process gases. Argon is used as non-reactive process gas.

Spinel coatings can be produced, for example, by means of reactive moderate-frequency sputtering by using a target composed of an alloy of the metal cations, especially a target composed of a CoFeMnCr alloy, and using oxygen as reactive gas. The amount of oxygen added can be used here to vary the stoichiometry of the coating, and especially also set it to a substoichiometric value, i.e. with oxygen deficiency. Particular preference is given to using, for the target alloy, a composition range in % by weight of:

| | |
|---|---|
| Co | 15-25, especially 19-21, |
| Fe | 30-40, especially 34-36, |
| Mn | 14-24, especially 18-20, and |
| Cr | 21-31, especially 25-27. |

The molar ratio of the composition of the target also corresponds to the molar proportions of Co, Fe, Mn and Cr in the coating.

In a preferred embodiment, the separating element, in the region of the cutout, has high transmission in the infrared spectral region. This enables the positioning of infrared-detecting sensors in the interior of the article of the invention or the use of radiation heating elements such as infrared sources. According to the sensor or heating element, transmission within a specific spectral region is important here.

The transmission values reported relate to the overall transmission of the sample, measured using an Ulbricht sphere. For this measurement, the sample is positioned between a suitable light source and an Ulbricht sphere at the inlet of the Ulbricht sphere. At an outlet of the Ulbricht sphere arranged laterally, at an angle of 90° to the beam path, is mounted a suitable sensor for detection of the transmitted light component. This measurement arrangement detects both the directly transmitted component and the scatteringly transmitted component of the light.

For silicon-based infrared sensors, as used, for example, in time-of-flight sensors for contactless input devices for gesture control or approach recognition, such as the VL6180X from ST Microelectronics, the spectral range between 850 and 1000 nm is of particular relevance. In this range, the separating element preferably has, at at least one wavelength, transmission of at least 3%, preferably at least 10%, more preferably at least 30%, in order to enable the use of such sensors. Particularly for gesture control, high transmissions are advantageous because gestures can then be detected at a greater distance from the outside of the separating element. Other applications for silicon-based infrared sensors are, for example, receivers for the signals from remote controllers or communication interfaces for optical data transfer.

InGaAs-based infrared detectors are sensitive particularly within the range between 1 and 2 µm. The separating element is suitable for the use of such detectors when it has, in the region of the cutout, at at least one wavelength, preferably at a wavelength of 1600 nm, a transmission of at least 30%, preferably at least 45%, more preferably at least 50%.

The emission maximum of a radiation heating element is found from Wien's displacement law, and for temperatures between 100° C. and 1000° C. is between 7.8 µm and 2.3 µm. For reasons of energy efficiency and in order to prevent excess heating of the separating element by a radiation heating element, the separating element, in the range between 3.25 µm and 4.25 µm, at at least one wavelength, has transmission of at least 10%, preferably at least 20%, more preferably at least 30%. In this spectral range, it is also possible to use bolometers or thermal columns disposed in the interior of the article to measure the temperature of a hot object in the exterior, for example a hot cooking vessel, when the transmission of the separating element meets the minimum demands specified.

In a preferred embodiment, the thickness of the glass or glass ceramic substrate is between 2 mm and 12 mm, preferably between 3 and 8 mm, more preferably between 3 and 6 mm. The thickness of the substrate is limited here essentially by the demands on mechanical stability and weight. Glasses thinner than 2 mm cannot be thermally tempered in practice for technical reasons since the cooling rates required for the purpose cannot be achieved at economically justifiable cost. In addition, it has to be noted that the thickness of the substrate can affect its optical properties. In each case, the thickness should be chosen so as to comply with the transmission limits mentioned.

The inventors have found that an additional advantageous effect occurs when the separating element is chosen such that the colour locus of D65 standard illuminant light, after passing through the separating element in the region of the cutout, i.e. after passing through the glass or ceramic substrate, is within the abovementioned white region W1: surprisingly, such separating elements can achieve an improved dead front effect. This is surprisingly achieved irrespective of whether the transmission of the separating element is established by addition of appropriate colouring components or via a coating.

The dead front effect is understood to mean the effect that electronic components disposed within an article of the invention, in the switched-off state, are invisible in the exterior, but that light which is emitted by inserted components such as display devices, lighting elements or optionally heating elements, can pass through the separating element with sufficient brightness and hence can be perceived in the exterior. For this purpose, the separating element on the one hand has to have minimum transmission in order to prevent viewing of the components, but on the other hand has to have maximum transmission in order to attenuate the light emitted by components to a minimum degree.

This is particularly difficult to achieve, for example, in the case of the coloured glass ceramics for cooktops that are known in the prior art, since these, owing to the V2O5 used predominantly for colouring, have a very inhomogeneous transmission profile that has very much higher transmission in the red spectral region than in the blue spectral region. But in order not to attenuate blue light, for example, from lighting elements in the interior of the cooktop too significantly, overall transmission must accordingly be chosen at a relatively high level, which in turn leads to very high transmission and hence a poor dead front effect in the red spectral region. For instance, in the case of a typical coloured glass ceramic known from the prior art with a light transmittance of 5.6%, the spectral transmittance in the blue spectral range of 450 to 500 nm is about 2.5-3%, whereas, in the red spectral range of 630 to 680 nm, it is between about 15% and 30%. The consequence of this is that both blue and red light can pass through the glass ceramic to a sufficient degree, but that there is no adequate dead front effect in the red spectral region since the components, in the switched-off state, at a transmission of 15% to 30%, can be perceived clearly, albeit only in red colour, in the exterior.

By contrast, separating elements of the invention have a very much flatter profile of the transmission curve. For example, a separating element of the invention having a light transmittance of 20.4% in the region of the cutout has a ratio of highest to lowest spectral transmittance in the range of 470 to 630 nm of only 1.1, where the highest transmittance value is at 470 nm and the lowest at 572 nm (see Example 10 in Table 2). What is achieved by this spectral profile is not just that D65 standard illuminant light after transmission is in the white region W1, but additionally that light of all wavelengths can pass efficiently through the separating element but no such high transmissions occur in any spectral region that the dead front effect is adversely affected. Preferably, the separating element in the region of the cutout has a ratio of the highest to the lowest spectral transmittance in the wavelength range of 470 to 630 nm of not more than 2.5, preferably not more than 2, further preferably not more than 1.8.

In other words, by comparison with the prior art, it is possible to achieve the advantages which follow. Given equal transmission in the blue spectral region, it is possible to choose lower light transmittance in the separating element and hence to achieve a better dead front effect overall. Alternatively, given equal light transmittance, it is possible to achieve higher transmission in the blue spectral region and hence better visibility of blue lighting elements, for example, and simultaneously a better dead front effect. As a further alternative, given a comparable dead front effect, it is possible to achieve higher light transmittance, which can be advantageous, for example, for the energy efficiency of the article of the invention.

The dead front effect can be determined by the measurement of a percentage grey value difference by the test method described hereinafter.

A grey value measurement device serves to determine percentage grey values, especially in order to be able to determine grey level differences between different regions. The measurement construction is within a dark chamber in order to be able to exclude outside light.

Two RAL cards are positioned within the dark chamber. The first RAL card has the RAL colour 9017 (traffic black) and the second RAL card has the RAL colour 7012 (basalt grey). As well as these RAL cards, the separating element to be analysed is positioned with covering means and display device.

At a distance d of, for example, 606 millimetres is positioned a camera with a lens. Optionally, a filter may be mounted in front of the lens, for example a longpass filter or a tristimulus filter.

In the measurement device used, the following components are used: The camera takes the form of an acA1920-40

µm greyscale camera from Basler AG, and the lens takes the form of a LM35HC Megapixel from Kowa GmbH. No optional filter is used in front of the lens.

The display area of the display device has a CIELAB colour locus in reflectance of $L^*=27.5$, $a^*=-0.7$ and $b^*=0.4$. The covering means used, in direct measurement, i.e. not measured through a glass or glass ceramic substrate, has a CIELAB colour locus in reflectance against a black trap of $L^*=28.8$, $a^*=-0.6$ and $b^*=-1.5$.

More particularly, the following camera settings are used, which are taken by the person skilled in the art concerned with the greyscale camera mentioned from the corresponding log file:

| | |
|---|---|
| Width | 1920 |
| Height | 1200 |
| OffsetX | 8 |
| OffsetY | 8 |
| CenterX | 0 |
| CenterY | 0 |
| BinningHorizontal | 1 |
| BinningVertical | 1 |
| ReverseX | 0 |
| ReverseY | 0 |
| PixelFormat | Mono8 |
| TestImageSelector | Off |
| GainAuto | Off |
| GainSelector | All |
| Gain | 0.00000 |
| GainSelector | All |
| BlackLevelSelector | All |
| BlackLevel | 0.00000 |
| BlackLevelSelector | All |
| Gamma | 1.00000 |
| RemoveParameterLimitSelector | Gain |
| RemoveParameterLimit | 0 |
| RemoveParameterLimitSelector | Gain |
| ExposureAuto | Off |
| ExposureMode | Timed |
| ExposureTime | 550000.0 |
| AcquisitionBurstFrameCount | 1 |
| TriggerSelector | FrameBurstStart |
| TriggerMode | Off |
| TriggerSelector | FrameStart |
| TriggerMode | Off |
| TriggerSelector | FrameStart |
| TriggerSelector | FrameBurstStart |
| TriggerSource | Line1 |
| TriggerSelector | FrameStart |
| TriggerSource | Line1 |
| TriggerSelector | FrameStart |
| TriggerSelector | FrameBurstStart |
| TriggerActivation | RisingEdge |
| TriggerSelector | FrameStart |
| TriggerActivation | RisingEdge |
| TriggerSelector | FrameStart |
| TriggerDelay | 0 |
| AcquisitionFrameRateEnable | 0 |
| AcquisitionFrameRate | 100.00000 |
| DeviceLinkSelector | 0 |
| DeviceLinkThroughputLimit | 360000000 |
| DeviceLinkSelector | 0 |
| DeviceLinkSelector | 0 |
| DeviceLinkThroughputLimitMode | On |
| DeviceLinkSelector | 0 |
| ChunkSelector | Gain |
| ChunkEnable | 0 |
| ChunkSelector | ExposureTime |
| ChunkEnable | 0 |
| ChunkSelector | Timestamp |
| ChunkEnable | 0 |
| ChunkSelector | LineStatusAll |
| ChunkEnable | 0 |
| ChunkSelector | CounterValue |
| ChunkEnable | 0 |
| ChunkSelector | PayloadCRC16 |
| ChunkEnable | 0 |
| ChunkSelector | Timestamp |
| ChunkModeActive | 0 |
| AutoTargetBrightness | 0.30196 |
| AutoFunctionProfile | MinimizeGain |
| AutoGainLowerLimit | 0.00000 |
| AutoGainUpperLimit | 36.00000 |
| AutoExposureTimeLowerLimit | 76.0 |
| AutoExposureTimeUpperLimit | 1000000.0 |

In the dark chamber, there are additionally LED spotlights from OSRAM Licht AG with colour temperature 4000 K, EAN: 4052899944282. The LED spotlights are adjusted such that there is a brightness of 1200 lux on the glass or glass ceramic substrate. In general, irrespective of the particular lighting means, provided that it has a typical domestic colour temperature and/or spectral intensity distribution, it is also possible to use another light source, for example a black-body source, especially a conventional halogen light source, provided that it has a brightness of about 1200 lux. This achieves a lighting situation typical of kitchens and laboratories. It should be pointed out that the measurements determined by means of the greyscale measurement device are essentially independent of brightness, and so other lighting may be provided.

For the measurement, the lighting system is switched on and the dark chamber is closed. The camera is used to record a greyscale image of the situation. In other words, by means of the greyscale measurement device, a greyscale image is produced that depicts at least the following: the display area of the display device in the switched-off state viewed through the separating element, the covering means viewed through the separating element, the RAL card with RAL colour 9017 and the RAL card with RAL colour 7012.

Based on the greyscale image produced, the greyscale measurement device provides a measurement M1 corresponding to the display area of the display device in the switched-off state, viewed through the separating element.

In addition, the greyscale measurement device provides a measurement M2 corresponding to the covering means, viewed through the separating element.

Furthermore, the greyscale measurement device provides two further measurements corresponding to the two RAL cards.

In the greyscale measurement device used, the greyscale image is evaluated with the aid of the Halcon SDK Industry 12 image evaluation software from MVTec Software GmbH. It has been found that the measurement is independent of the lighting conditions and the brightness of lighting, provided that the image is not under- or overexposed. An evaluation routine in the software can be used to evaluate different measurement windows distributed over the image in respect of their greyscale levels. In each measurement window, the average of the grey values of all pixels can be measured across the measurement area including the standard deviation and recorded. In other words, the measurements M1, M2 and the measurements for the RAL cards can be formed as averages over measurement regions, where the measurement regions each have an area of 0.2 cm², preferably 0.9 cm².

Based on the absolute measurements M1, M2 and the measurements for the two RAL cards, each of which are absolute values, percentage greyscale levels G1 and G2 are calculated. In other words, relative contrasts are calculated in percent in order to make measurements comparable.

For this purpose, a linear function G is defined in that this linear function assigns a percentage grey value of 20% to the measurement corresponding to the RAL card with RAL colour 9017, and a percentage grey value of 90% to the measurement corresponding to the RAL card with RAL colour 7012. In other words, the measurements for the RAL cards 9017 are referenced as 20% and 7012 as 90%, which defines a linear conversion for all grey values measured.

The linear function G=G(M), which converts absolute measurements to percentage grey values, calculates the percentage grey values G1 and G2 as G1=G(M1) and G2=G(M2).

Optionally, further RAL cards may also additionally be provided in the dark chamber, for example with RAL colour 9003 (signal white), RAL colour 9006 (white aluminium), RAL colour 9005 (deep black) and/or RAL colour 7038 (agate grey). The RAL cards may further also be at least partially covered by the separating element.

The difference in the two percentage grey values measured, |G1-G2|, is a measure of the dead front effect. It has been found that values below 5.0% are barely perceptible by the human eye. In other words, a dead front effect is achieved. For an even better dead front effect, it is preferable when the grey value difference is less than 3.5%, more preferably less than 2.5% and especially preferably less than 1.5%. To determine these values, a statistical analysis was conducted with different observers.

In a preferred embodiment, the article of the invention has a difference |G1-G2| between a percentage grey value G1 of the article in the region of the cutout in the covering means with the display device switched off and a percentage grey value G2 of the article in the region of the covering means without cutout of less than 5.0%, preferably of less than 3.5%, more preferably of less than 2.5% and most preferably of less than 1.5%. Preferably, this grey value difference is achieved at a light transmittance of the separating element in the region of the cutout in the covering means of at least 5%, preferably at least 9%, more preferably at least 15%, most preferably at least 20%.

A further means of quantifying the dead front effect is to place the separating element without the covering means onto a black background and onto a white background, and to measure the colour locus in the CIELAB colour space for the two backgrounds as otherwise described above. The measurements can be used to calculate the maximum colour distance:

$$\Delta E = \sqrt{(L^*_{black} - L^*_{white})^2 + (a^*_{black} - a^*_{white})^2 + (b^*_{black} - b^*_{white})^2}$$

The separating element preferably has a colour distance of $\Delta E < 35$, preferably <10, more preferably <6.

This value also depends on the light transmittance of the sample and increases with increasing light transmittance. In a preferred embodiment, the quotient of colour distance to light transmittance is less than 1.5, preferably less than 1, more preferably less than 0.8, for a light transmittance of more than 5%.

Yet another way of quantifying the dead front effect is to measure the spectral reflectivity R1($\lambda$) of the display surface of the display device in the switched-off state through the separating element and spectral reflectivity R2($\lambda$) of the covering means in the spectral range of 400 to 700 nm through the separating element, for example by means of a PerkinElmer Lambda 850 UV/VIS spectrophotometer.

The two measured spectral reflectivities can be used to calculate, by the formula:

$$\rho_i = \frac{\int_{S_1}^{S_2} R_i(\lambda) \, d\lambda}{\int_{S_1}^{S_2} d\lambda}$$

with S1=400 nm and S2=700 nm, the reflectance $\rho$i (i=1.2). In a preferred embodiment, the difference in the reflectances |$\rho$1-$\rho$2| is less than 3%, preferably less than 1.5%.

In a preferred embodiment, the glass or glass ceramic substrate, in the region of the display device, has a surface quality matched to the increase in the display quality. For example, the side facing the exterior of the article of the invention may be polished and hence have very low surface roughness, which advantageously minimizes the scatter of the light emitted by the display device at this surface. In this way, a display device can achieve particularly high contrast values.

Alternatively, it may also be advantageous to structure the surface facing the exterior in a controlled manner, for example by means of rolling, etching or an anti-glare coating, in order to increase the proportion of scattered light. This can have the advantage of minimizing reflections on the outside and hence enabling better visibility of the display device.

In a further preferred embodiment, the glass or glass ceramic substrate is optimized at least in the region of the display device such that it causes minimum scatter for visible light. What this means is, for example, that the substrate has less than 3 bubbles per kg of glass or glass ceramic, preferably less than 2 bubbles per kg, more preferably less than 1 bubble per kg, based on a bubble size of at least 100 am in diameter. Furthermore, it is advantageous when the substrate consists of glass ceramic having minimum intrinsic light scatter at the crystallites present. This is the case especially when the crystallites have an average size of less than 250 nm in diameter and the difference in refractive index between crystalline phase and residual glass phase is at a minimum. Both parameters can be greatly influenced by the choice of material composition and the ceramization conditions, especially the slope of the temperature ramps, duration of ceramization and maximum temperature during the ceramization.

Preferably, the separating element in the visible spectral region has a haze of not more than 5%, preferably not more than 2%, more preferably not more than 1%. According to standard ASTM D1003, haze is understood to mean the proportion of light transmitted by a sample which is deflected by scatter by an angle of more than 2.5° relative to the optical axis of the light of the CIE-C illuminant incident on the sample. Haze can be measured, for example, with the BYK haze-gard instrument according to standard ASTM D1003. At a haze of not more than 5%, particularly good visibility of the display device is assured.

Alternatively or additionally, the separating element preferably has a clarity in the visible spectral region of at least 90%, preferably at least 95%, most preferably at least 98%. According to standard ASTM D1003, clarity is understood to mean the proportion of light transmitted by a sample which is deflected by scatter by an angle of not more than 2.5° relative to the optical axis of the light of the CIE-C illuminant incident on the sample. Clarity can be measured, for example, with the BYK haze-gard instrument according to standard ASTM D1003.

Working examples of transparent coloured glass ceramics suitable for use in articles of the invention and comparative examples are specified in Tables 1 to 4.

Tables 1 and 3 show the base compositions of crystallizable glasses and the properties thereof in the vitreous state, i.e. prior to ceramization.

Table 2 contains, in the "Dopants" field, the colour additions present in the respective starting glass and some selected properties of the resulting glass ceramics. All examples in Table 2 are based on the base composition of the glass in Table 1.

Table 4 contains some selected properties of the resulting glass ceramics. These are based on the base compositions of the glasses in Table 3.

Table 1 shows a base composition for crystallizable glasses and the properties thereof. Apart from the colouring constituents, the base composition base glass 1 corresponds to the comparative glass 1 according to the prior art outside the invention. Table 1 also lists the following properties in the vitreous state: transformation temperature Tg [° C.], working temperature VA [° C.], 102 temperature [° C.] and upper devitrification limit UDL [° C.]. For measurement of the UDL, the glasses were fused in Pt/Rh10 crucibles. Subsequently, the crucibles were kept at different temperatures in the region of the working temperature for 5 hours. The uppermost temperature at which the first crystals occur at the contact surface of the glass melt with the crucible wall determines the UDL.

Different contents of colouring compounds are added to the batch raw materials of this base composition, and new glasses are fused. By addition of the $MoO_3$ component, compositions of the invention are obtained. The glasses thus obtained in Table 2 have the base composition of glass 1 and differ merely in the colouring compounds specified and optionally reducing additives. They are crystallized by the ceramization programs listed in Table 2. The transmission properties of the glass ceramics obtained are listed. The main crystal phase measured by x-ray diffraction is also listed.

Examples 1 and 2 are comparative examples from the prior art (WO 2010/102859 A1), with a $V_2O_5$ content of 0.023% by weight, which were ceramized from glass 1 with different programs.

Inventive example 3 contains less than 0.015% by weight of $V_2O_5$. By comparison with the $V_2O_5$-free examples, Examples 4-11, Ex. 3 shifts D65 standard illuminant light more strongly in the red direction, namely to x coordinates >0.4. By contrast with Comparative Examples 1 and 2, however, the value is still in the region of x<0.5. Light transmitted through the glass ceramic of Example 3 at a thickness of 4 mm is within the white region W1, but is not within the white region W2 owing to the $V_2O_5$ content.

Table 3 shows the compositions of further crystallizable glasses and selected properties. Comparative glass 9, in terms of its composition, corresponds to the KeraVision® glass ceramic from EuroKera. The glass doped with Fe, V, Mn and Co, after transformation to the comparative glass ceramic 12 (Table 4), does not attain the low colour of the invention; more particularly, light transmitted through such a glass ceramic is no longer within the white region W1. Examples 13 and 14 produced from the crystallizable glasses 10 and 11 have been refined not with $SnO_2$ but with $As_2O_3$. The described effects of the weaker redox partner As are manifested. Compared to Sn, colouring with $MoO_3$ is much lower, and even the addition of reducing compounds cannot significantly reduce the brightness, unlike in the case of $SnO_2$-refined glass ceramics.

The ceramization program 1 involves heating up to a temperature of 600° C. in the ceramization oven within 20 min. The oven is heated up further. The total time from room temperature to 680° C. is 23 min. The temperature range from 680° C. to 800° C. is important for nucleation. Therefore, the oven is heated up further. The total time between 680° C. and 800° C. is 19 min. Above about 800° C., the desired high quartz mixed crystal phase crystallizes. The total time from 800° C. until attainment of the maximum temperature of 918° C. is 24 min (heating rate 5° C./minute). At the maximum temperature of 918° C., hold time 10 min, the composition of crystals and residual glass is established and the microstructure is homogenized. This establishes the chemical and physical properties of the glass ceramic. Cooling is effected in a controlled manner to 800° C. (cooling rate 6° C./min), then the sample is quenched to room temperature by opening the oven door; in other words, in summary:

Ceramization program 1 (ceramization time 96 min): a) heating within 23 minutes from room temperature to 680° C.; b) temperature increase from 680 to 800° C. within 19 min, involving heating at 10° C./min to 730° C., further heating at 5° C./min to 800° C.; c) temperature increase from 800° C. to 918° C. within 24 min and hold time of 10 min at maximum temperature; d) cooling down to 800° C. within 20 minutes, then rapid cooling to room temperature.

In ceramization program 2, the ceramization has been shortened.

Ceramization program 2 (ceramization time 68 min): a) rapid heating from room temperature to 740° C. within 26 min, b) temperature increase from 740 to 825° C. within 18 min (heating rate 4.7° C./min), c) temperature increase from 825° C. to 930° C. within 4 min (heating rate 26° C./min), hold time of 4 min at maximum temperature, d) cooling down to 800° C. within 16 minutes, then rapid cooling to room temperature.

An additional ceramization program 3 effected transformation to glass ceramics with keatite mixed crystals as main crystal phase. In this program, the procedure of program 1 was followed up to 800° C. Then, in a departure from program 1, heating was effected at a heating rate of 5° C./min to a maximum temperature of 960° C. with hold time 10 min. Cooling was effected from the maximum temperature at 6° C./min to 800° C., and then cooling was effected rapidly to room temperature.

The glass ceramics of Examples 9 and 12 that were produced by the ceramization program 3 contain, measured by x-ray diffraction, 79% keatite mixed crystals as main crystal phase. At the same time, crystallite sizes are enlarged at about 120 nm, and so disruptive scatter occurs when display devices are used below the glass ceramic. The other glass ceramics produced with the ceramization programs 1 and 2 contain high quartz mixed crystals at generally more than 90% of the total crystal phase content. Further crystal phases are the nucleator phases $ZrTiO_4$. At the same time, crystallite sizes are so small at less than 70 nm that no disruptive scatter occurs when display devices are used below the glass ceramic.

All examples except for Ex. 6 have high quartz mixed crystal (HQMC) as main crystal phase.

The thermal expansion of the glass ceramics with high quartz mixed crystal as main crystal phase is $0\pm0.5\cdot10-6/K$ in the range of 20-700° C., i.e. meets the demands for thermally stable glass ceramics.

The transmission measurements were conducted on polished plates with the Perkin-Elmer Lambda 900 instrument. Transmission was determined on samples having a thickness of 3.5 to 4.1 mm and converted to a thickness of 4 mm. Spectral transmittances are reported for selected wavelengths. The measured spectral values in the range between 380 nm and 780 nm, which represents the visible light spectrum, are used to calculate the brightness L* and the colour coordinates a*, b* in the CIELAB colour system, and the brightness Y and colour coordinates x, y to DIN 5033 in the CIE colour system for the chosen standard illuminant and observer angle 2°. The chromaticity c* and the colour distance d of D65 standard illuminant light after transmission through a sample of thickness 4 mm relative to the original colour coordinates of D65 standard illuminant light (x=0.3127 and y=0.3290) are reported. The latter was calculated as follows:

$$d=\sqrt{(x-0.3127)^2+(y-0.3290)^2}.$$

Particularly Ex.10 with a light transmittance (Y) of 20.4% in Table 2 makes it clear that it is possible with such glass ceramics to produce separating elements that virtually do not shift the colour locus of transmitted light. This colour distance for Ex. 10 is only d=0.003 and is thus negligible within the scope of measurement accuracy. The colour distance in the comparative examples is worse by a factor of 50 to 70.

The profile of the transmission curve in the range from 470 to 630 nm was used to calculate the flatness of the transmission (quotient of highest to lowest transmission in this range). The wavelengths for the maximum and minimum transmission value are likewise reported. The values are reported for 4 mm-thick polished samples.

The scatter of the glass ceramics is determined by measuring haze. This involves measuring samples of thickness 3.5-4.1 mm that have been polished on both sides with a commercial "haze-gard plus" measuring instrument from BYK Gardner (standard ASTM D1003-13) with standard light C. Scatter is characterized by the haze value in the tables.

In addition, a visual assessment is conducted on the samples with a commercial white LED of the 7-segment display type (manufacturer: opto devices, model: OS39D3BWWA). The polished glass ceramic samples were placed onto the white LED at a distance 1 mm and viewed from above at a distance of 31 cm over the entire angle range, i.e. perpendicularly to obliquely to the glass ceramic surface. Depending on the brightness of the glass ceramic sample, the luminance of the white LED at this distance at right angles to the glass ceramic plate is regulated to 60 cd/m², or, in the case of very dark glass ceramic samples Y<0.5%, operated at maximum power. In order to rule out the influence of outside light, the assessment is undertaken in a dark chamber with low ambient lighting of about 4 lux. For a cooktop, these conditions mean a very critical installation and lighting situation.

The visual assessments in the tables mean: 1=no scatter perceptible, 2=low but tolerable scatter, 3=visible scatter, requires additional work for the configuration of the cooktop, 4=distinctly visible scatter, intolerable. Ratings over and above stage 4 are impermissible, and those over and above stage 3 should preferably be avoided. Apart from Example 6 with keatite mixed crystal (KMC) as main crystal phase, the examples have no visible scatter.

For some samples, greyscale difference measurements for quantification of the dead front effect were conducted. All samples measured had a greyscale differential ΔG between 0.1% and 3%, i.e. an effective dead front effect. Particularly the samples having a light transmittance of about 20% or less had greyscale differentials between 0.1% and 0.3%. For these measurements, a display device having a display surface that has a CIELAB colour locus in reflectance of L*=27.5, a*=−0.7 and b*=0.4 was used. The covering means used, in direct measurement, i.e. not through a glass or glass ceramic substrate, had a CIELAB colour locus in reflectance against a black trap of L*=28.8, a*=0.6 and b*=−1.5.

Tables 5, 6 and 7 list working examples of transparent, uncoloured, thermally stable substrates of thickness 4 mm that are composed of glass ceramics of the CERAN® Cleartrans type with different coatings having corresponding optical properties that are suitable for articles of the invention. CERAN® Cleartrans has a coefficient of thermal expansion CTE in the range of 20° C. to 300° C. between −1×10−6/K and 1×10−6/K. Example B1 is a comparative example. The cited properties of the coatings are essentially independent of the substrate chosen. Therefore, the coatings mentioned are likewise suitable for combination with thermally stable glasses. The coatings can likewise be applied to coloured glass ceramics and glasses that are suitable for the invention, for example those mentioned in Tables 2 and 4.

The coatings were produced by means of reactive medium-frequency sputtering of metallic alloy targets. This was done with supply of oxygen as reactive gas.

Materials used here were CoFeMnCr for the spinel layers and MoSiOx for the cermet layer. For example B3, a target composed of an MoSi alloy having a proportion by weight of 32% by weight of Mo and 68% by weight of Si was used.

Comparative example B1 is a dark spinel coating without a compensation layer that does not meet the demands with regard to colour locus in reflectance. The high negative b* value means that this coating looks blue.

Examples B2 to B9 are colour-neutral black coatings with light transmittances (Y) in the range of 29.5% to 36.7%. The colour loci are in the range of 26<L*<31, −3<a*<3, −3<b*<3. For these examples, D65 standard illuminant light after passage through the coating and the substrate has a colour locus in the white region W2. The colour temperatures are in the warm white portion of W2 at about 3500 K to 4500 K.

These examples still have a haze of less than 0.5% and are thus of very good suitability for use in combination with display devices such as TFT displays. Since they likewise have high sheet resistance, they are suitable both for use with induction coils and with capacitative or inductive sensors.

The transmission of the examples in the infrared spectral region is likewise suitable for the use of various infrared sensors and radiative heating elements.

The examples have a flat transmission profile in the visible spectral region. The ratio of spectral transmission at 630 nm to that at 470 nm is about 1.8 to 2.0.

Examples B3 to B9 are MoSiOx cermet coatings having a composition in the region of 20:80 Mo:Si to 35:65 Mo:Si. The Mo:Si ratio relates to the respective proportion in % by weight in the coating. This does not take account of the oxygen content or other constituents in the coating.

BRIEF DESCRIPTION OF THE DRAWINGS

FIG. 1b shows an enlarged detail from FIG. 1a.

DETAILED DESCRIPTION

Figure 1A:
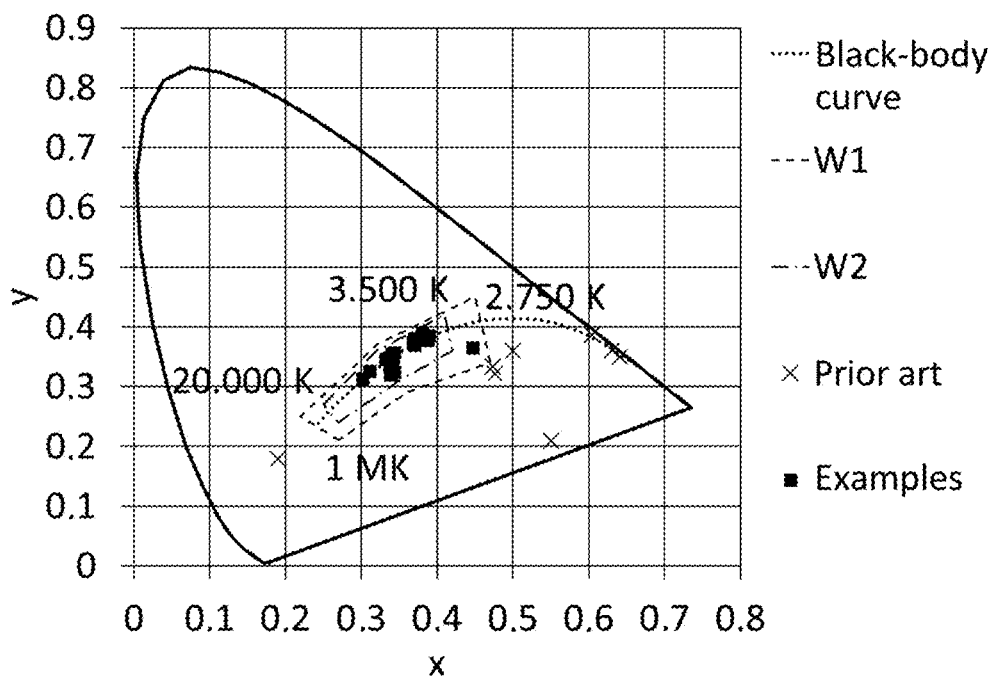
FIG. 1a shows a chromaticity diagram of the CIExyY colour space.
Figure 1B:
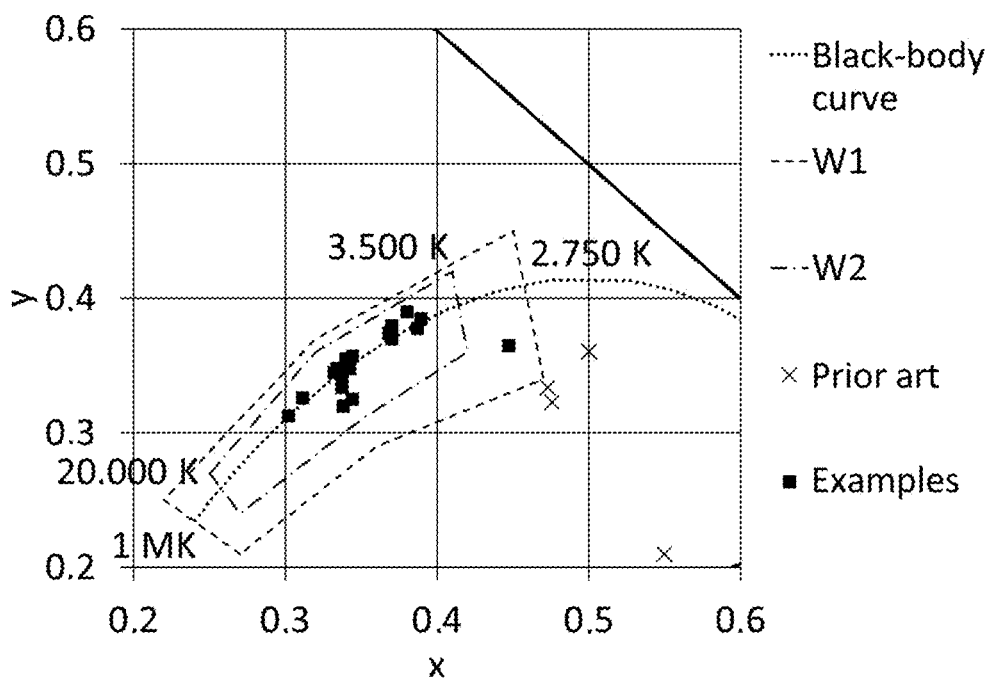

FIG. 1a and FIG. 1b show chromaticity diagrams of the CIExyY colour space with 2° standard observer (CIExyY-2°). FIG. 1b shows an enlarged detail of the overall region of the chromaticity diagram shown in FIG. 1a.

The figures depict the black-body curve as a dotted line, the two white regions W1 and W2 as dashed lines, the colour coordinates of the examples that are listed in the tables and are suitable for use in an article of the invention as black squares, and examples from the prior art as black crosses.

Every point on the black-body curve corresponds to the colour locus of the light emitted by a black-body radiator at a defined temperature, called the colour temperature. This curve is of particular relevance to human perception since the sun likewise corresponds to a black-body radiator and hence the colour of sunlight is on the black-body curve. According to the position of the sun, the colour locus moves between cooler and warmer colour loci; a colour temperature of 20 000 K corresponds to a clear sky and a temperature of 3500 K to evening sunlight shortly before the commencement of dusk. Colour loci at or close to the black-body curve are therefore perceived as white and particularly natural.

The prior art described consists partly of the glass ceramic types specified in WO 2012076414 A1 and partly of commercially available glass ceramics from SCHOTT AG and Eurokera. These examples from the prior art are all outside the white region W1. As known from WO 2012076414 A1, the white region W1 can be covered by these glass ceramics only through the use of additional, complex compensation filters. However, the inventive examples cover this region even without such a filter. All the colour loci shown relate to a material thickness of 4 mm.

The examples adopted from Tables 2, 4, 5, 6 and 7 are all within the white region W1. Among these, all examples that contain less than 0.01% by weight of V2O5 in the glass ceramic, i.e. including the coating examples from Table 5 that have been applied to V2O5-free glass ceramics, are also within the white region W2. In addition, the V2O5-free glass ceramics from Tables 2 and 4 are also within the white region W3 (not shown).

Figure 2:
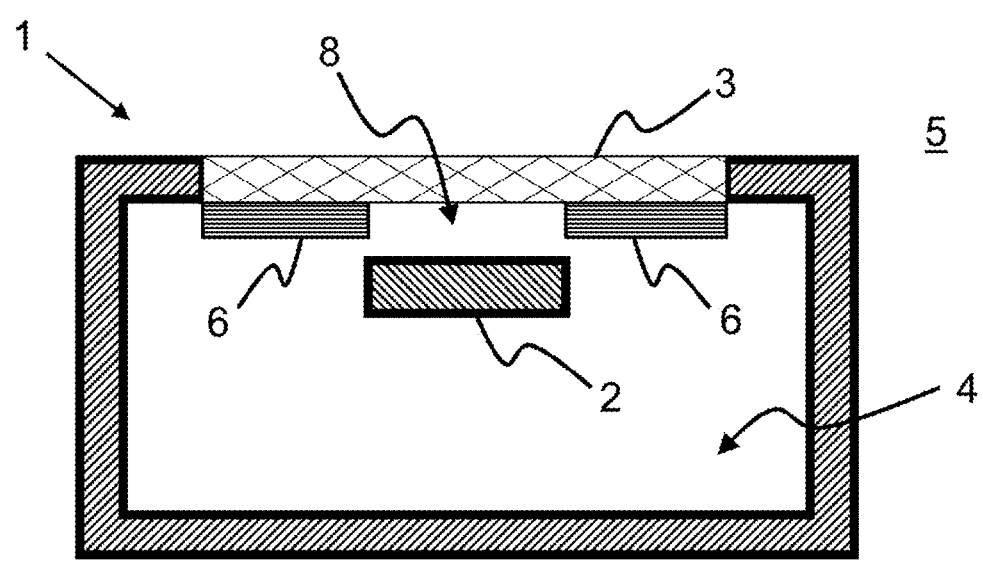
FIG. 2 is a schematic diagram of an embodiment of a fitout article or article of equipment of the disclosure in cross section.

FIG. 2 contains a schematic illustration of an article of the invention in cross section. The fitout article or article of equipment (1) shown for a kitchen or laboratory comprises a display device (2) and a separating element (3) that divides sections of an interior (4) of the article (1) from an exterior (5). The display device (2) is disposed in the interior (4) of the article (1) such that the light emitted by the display device (2) passes through a section of the separating element (3) and is perceptible by a user in the exterior (5) of the article (1). In the embodiment shown, the separating element (3) consists of a glass or glass ceramic substrate having a coefficient of thermal expansion CTE of −6×10−6/K to 6×10−6/K in the temperature range between 20° C. and 300° C. A covering means (6) disposed on the side of the separating element (3) facing the interior (4) of the article (1) has a light transmittance of at most 7% and has a cutout (8) in the region of the display device (2). The separating element (3) in the region of this cutout (8) has a light transmittance of at least 5% and of at most 70%. The covering means (6) has a colour locus in the CIELAB colour space having the coordinates L* of 20 to 40, a* of −6 to 6 and b* of −6 to 6. The colour locus of the D65 standard illuminant light after passing through the glass or glass ceramic substrate of the separating element (3) in the region of the cutout (8) of the covering means (6) is within the white region W1.

Fitout articles or articles of equipment of the invention for kitchens or laboratories may also contain a multitude of further components in their interior in addition to the display device.

The articles may, for example, have one or more heating elements for heating an article, for example a pan, in the exterior or even in the interior of the article. These may especially be radiative heating elements, induction heating elements, gas heating elements or microwave generators.

The articles may have further display devices and other lighting elements such as point, linear or areal light sources. These include, for example, LEDs, optical fibres and OLEDs. These light sources can emit in a particular colour, especially white, red, green and/or blue, or else variable colours. Between these display devices or lighting elements and the separating element, it is also possible for additional colour filters to be provided, for example in order to be able to utilize a white LED for production of a coloured lighting effect with a defined colour locus and high colour saturation.

Further display devices that may be provided may be either segment displays or graphic displays. The segment displays may especially be designed as coloured 7-segment displays. The graphic displays are preferably TFT displays, for example LCDs or OLED displays.

Lighting elements may especially also be disposed in the hot region in the vicinity of heating elements. In this case, especially for the production of white lighting effects in the exterior of the article, it is advantageous that no temperature-sensitive black-body compensation filters are required.

In a preferred embodiment, in addition to a lighting element, one or more scattering or diffuser layers may be provided. Preferably, such layers are used in combination with at least one covering layer between substrate and lighting element and with at least one cutout in the covering layer. Scattering and diffuser layers can especially be used to produce a homogeneous lighting effect of linear and areal lighting elements.

Scattering and diffuser layers may optionally also be executed in coloured form. Coloured scattering and diffuser layers may simultaneously function as diffuser and as optical filter.

Such scattering or diffuser layers may have a thickness of 1 to 15 μm, for example. They may contain non-coloured scattering particles, for example of TiO2, SiO2, Al2O3, ZrO2 or other metal oxides. The average size of such particles may be less than 1 μm. Preferably, the scattering or diffuser layers have high homogeneity of the luminance produced, low granularity and high brightness. This results in a perception of a very homogeneously lit area which is very pleasing to the user.

The articles may have cooling aggregates, for example Peltier elements, in thermal contact with the separating element in order to produce a cooling surface, for example for cooling of foods or chemicals, on the exterior-facing side of the separating element.

The article may have various sensors, for example capacitative touch sensors for control or infrared sensors for gesture control or for measurement of the temperature of hot articles in the exterior, for example hot pans. In addition, the article may have microphones and cameras, for example for voice control or user recognition and authentication. This may be particularly advantageous in laboratories, for example, if the article may be used only by correspondingly trained personnel. Such sensors may have been printed, pressed, bonded or adhesive-bonded, or arranged in some other way, on the inside of the separating element. This is particularly true of touch sensors.

The article may have various interfaces for communication, for example WLAN, Bluetooth or NFC modules or infrared interfaces. By means of such interfaces, the article can be connected, for example, either to the Internet or to other articles in its vicinity, for example pans with a corresponding interface or other electronic devices. More particularly, for control and communication, it can be connected to a mobile electronic device, such as a mobile phone or a tablet.

The article may contain a device for wireless energy transmission from articles in the exterior, especially by means of induction coils and in accordance with the Qi standard.

The separating element may have coatings on the exterior-facing side, for example anti-scratch layers, anti-reflection layers, anti-glare layers, decorative layers, easily cleanable layers or infrared-reflecting layers, provided that these do not alter the essential optical properties of the separating element.

The separating element may have cutouts, for example recesses for sinks or down-draft fume hoods or bushings for pipelines.

Likewise optionally, the separating element may have edge elaboration, for example a facet or a pencil finish.

All these constituents may be present individually or in combination.

TABLE 1

COMPOSITION AND PROPERTIES OF THE CRYSTALLIZABLE BASE GLASS 1 WITH BASE COMPOSITION.

|  | % by wt. | Glass No. 1 |
|---|---|---|
| Composition |  |  |
| $Li_2O$ |  | 3.80 |
| $Na_2O$ |  | 0.60 |
| $K_2O$ |  | 0.25 |
| MgO |  | 0.29 |
| CaO |  | 0.40 |
| SrO |  | 0.02 |
| BaO |  | 2.23 |
| ZnO |  | 1.53 |
| $Al_2O_3$ |  | 20.9 |
| $SiO_2$ |  | 65.0 |
| $TiO_2$ |  | 3.10 |
| $ZrO_2$ |  | 1.38 |
| $P_2O_5$ |  | 0.09 |
| $SnO_2$ |  | 0.25 |
| $As_2O_3$ |  | 0 |
| $MnO_2$ |  | 0.025 |
| $H_2O$ - content (β-OH) | $mm^{-1}$ | 0.39 |
| Properties in glass form |  |  |
| Transformation temperature $T_g$ | °C. | 662 |
| $10^2$ temperature | °C. | 1742 |
| Working temperature $V_A$ | °C. | 1306 |
| UDL temperature | °C. | 1260 |

TABLE 2

DOPANTS AND PROPERTIES OF THE INVENTIVE GLASS CERAMICS AND COMPARATIVE EXAMPLES 1 AND 2

| Example No. | | 1 | 2 | 3 | 4 | 5 | 6 | 7 |
|---|---|---|---|---|---|---|---|---|
| Glass No. | | 1 | 1 | 2 | 3 | 4 | 4 | 5 |
| Base glass | | 1 | 1 | 1 | 1 | 1 | 1 | 1 |
| Dopants (% by wt.) | | | | | | | | |
| $Fe_2O_3$ | | 0.090 | 0.090 | 0.120 | 0.088 | 0.086 | 0.086 | 0.090 |
| $V_2O_5$ | | 0.023 | 0.023 | 0.010 | | | | |
| $MoO_3$ | | | | 0.057 | 0.078 | 0.013 | 0.013 | 0.057 |
| $Cr_2O_3$ | | | | | | | | |
| $CeO_2$ | | | | | | | | |
| $WO_3$ | | | | | | | | |
| Addition to batch | | | | | | | | |
| Ceramization | # | 1 | 2 | 1 | 1 | 1 | 3 | 1 |
| Properties in ceramized form | | | | | | | | |
| Transmission, thickness 4 mm, D65 standard light, 2° | | | | | | | | |
| 470 nm | % | 1.2 | 0.7 | 2.9 | 13.3 | 41.6 | 33.5 | 16.7 |
| 630 nm | % | 9.9 | 6.6 | 12.6 | 17.2 | 58.1 | 43.7 | 21.7 |
| 950 nm | % | 73.0 | 71.9 | 66.5 | 60.8 | 75.5 | 73.0 | 62.1 |
| 1600 nm | % | 76.4 | 76.3 | 70.9 | 74.8 | 77.1 | 76.3 | 75.1 |
| 3700 nm | % | 52.0 | 51.1 | 50.0 | 52.2 | 52.4 | 56.1 | 51.0 |
| Colour coordinates (CIE) in transmission | | | | | | | | |
| x | | 0.502 | 0.517 | 0.447 | 0.337 | 0.344 | 0.340 | 0.337 |
| y | | 0.367 | 0.358 | 0.365 | 0.334 | 0.357 | 0.355 | 0.339 |
| Brightness Y | % | 3.6 | 2.2 | 5.8 | 13.6 | 50.1 | 38.2 | 17.6 |
| Colour distance d | | 0.193 | 0.207 | 0.139 | 0.025 | 0.042 | 0.038 | 0.026 |
| Colour coordinates (CIELAB) in reflectance | | | | | | | | |
| L* | | 25.19 | 24.99 | 25.74 | 26.52 | 29.79 | | 25.66 |
| a* | | 0.28 | 0.04 | 0.39 | 0.16 | 0.16 | | 0.15 |
| b* | | −0.66 | −0.78 | 0.80 | −0.80 | −2.12 | | −0.9 |

TABLE 2-continued

| | | | | | | | | |
|---|---|---|---|---|---|---|---|---|
| c* | | 0.72 | 0.78 | 0.89 | 0.82 | 2.13 | | 0.91 |
| ΔE | | 4.26 | 0.68 | 5.58 | | 19.55 | | |
| \|G$_1$-G$_2$\| | % | | | | 0.2 | 1.6 | | 0.1 |
| Flatness | nm | 8.4 | 10.0 | 4.4 | 1.4 | 1.4 | 1.3 | 1.3 |
| transmission (wavelength max./min.) | | 630/470 | 630/470 | 630/470 | 630/529 | 630/470 | 630/470 | 630/524 |

Scatter, thickness 4 mm, D65 standard light, 2°

| | | | | | | | | |
|---|---|---|---|---|---|---|---|---|
| Visual assessment | | 1 | 1 | 1 | 1 | 1 | 3 | 1 |
| Haze | % | 0.8 | 0.5 | 1.5 | 1.5 | 1.7 | 10.7 | 1.3 |

Thermal expansion

| | | | | | | | | |
|---|---|---|---|---|---|---|---|---|
| CTE α$_{20/300}$ | 10$^{-6}$/K | −0.26 | −0.29 | | | | | −0.24 |
| CTE α$_{20/700}$ | 10$^{-6}$/K | 0.13 | 0.17 | | | 0.70 | | 0.16 |

X-ray diffraction

| | | | | | | | | |
|---|---|---|---|---|---|---|---|---|
| Main crystal phase | | HQMC | HQMC | HQMC | HQMC | HQMC | KMC | HQMC |

DOPANTS AND PROPERTIES OF INVENTIVE GLASS CERAMICS.

| | | | | | |
|---|---|---|---|---|---|
| Example No. | | 8 | 9 | 10 | 11 |
| Glass No. | | 6 | 6 | 7 | 8 |
| Base glass | | 1 | 1 | 1 | 1 |

Dopants (% by wt.)

| | | | | | |
|---|---|---|---|---|---|
| Fe$_2$O$_3$ | | 0.062 | 0.062 | 0.061 | 0.062 |
| V$_2$O$_5$ | | | | | |
| MoO$_3$ | | 0.015 | 0.015 | 0.019 | 0.014 |
| CoO | | | | | |
| Cr$_2$O$_3$ | | | | | |
| Nd$_2$O$_3$ | | | | | 0.042 |
| NiO | | | | | |
| Addition to batch | | | | 0.1% sugar without nitrate | |
| Ceramization | # | 1 | 2 | 1 | 1 |

Properties in ceramized form
Transmission, thickness 4 mm, D65 standard light, 2°

| | | | | | |
|---|---|---|---|---|---|
| 470 nm | % | 42.6 | 43.4 | 22.2 | 42.8 |
| 630 nm | % | 53.4 | 52.7 | 21.2 | 54.2 |
| 950 nm | % | 76.4 | 75.9 | 57.4 | 76.5 |
| 1600 nm | % | 80.8 | 80.4 | 78.1 | 80.8 |
| 3700 nm | % | 53.6 | 53.4 | 50.5 | 53.2 |

Colour coordinates (CIE) in transmission

| | | | | | |
|---|---|---|---|---|---|
| x | | 0.335 | 0.332 | 0.311 | 0.334 |
| y | | 0.348 | 0.345 | 0.326 | 0.348 |
| Brightness Y | % | 47.6 | 47.4 | 20.4 | 47.8 |
| Colour distance d | | 0.029 | 0.025 | 0.003 | 0.029 |

Colour coordinates (CIELAB) in reflectance

| | | | | | |
|---|---|---|---|---|---|
| L* | | 28.13 | 28.42 | 25.84 | |
| a* | | 0.32 | 0.30 | −0.05 | |
| b* | | 0.15 | 0.31 | −1.27 | |
| c* | | 0.35 | 0.43 | 1.27 | |
| ΔE | | 22.43 | 23.22 | 5.33 | |
| \|G$_1$-G$_2$\| | | 3.0 | | 0.3 | |
| Flatness | nm | 1.3 | 1.2 | 1.1 | 1.3 |
| transmission (wavelength at max./min.) | | 630/470 | 630/470 | 470/572 | 630/470 |

Scatter, thickness 4 mm, D65 standard light, 2°

| | | | | | |
|---|---|---|---|---|---|
| Visual assessment | | 1 | 1 | 1 | 1 |
| Haze | % | 1.9 | 1.6 | 2.7 | |

TABLE 2-continued

| | | | | | |
|---|---|---|---|---|---|
| Thermal expansion | | | | | |
| CTE $\alpha_{20/300}$ | $10^{-6}$/K | −0.24 | −0.28 | −0.24 | −0.21 |
| CTE $\alpha_{20/700}$ | $10^{-6}$/K | 0.16 | 0.09 | 0.14 | 0.16 |
| X-ray diffraction | | | | | |
| Main crystal phase | | HQMC | HQMC | HQMC | HQMC |

TABLE 3

COMPOSITIONS AND PROPERTIES OF CRYSTALLIZABLE GLASSES AND COMPARATIVE GLASS NO. 9

| | % by wt. | Glass No. 9 | 10 | 11 | 12 |
|---|---|---|---|---|---|
| Composition | | | | | |
| Li$_2$O | | 3.83 | 3.83 | 3.79 | 3.31 |
| Na$_2$O | | 0.57 | 0.61 | 0.60 | 0.37 |
| K$_2$O | | 0.21 | 0.27 | 0.26 | 0.36 |
| MgO | | 0.19 | 0.30 | 0.29 | 0.56 |
| CaO | | 0.36 | 0.43 | 0.43 | 0.58 |
| SrO | | | 0.02 | 0.02 | |
| BaO | | 2.41 | 2.21 | 2.23 | 1.62 |
| ZnO | | 1.41 | 1.49 | 1.47 | 1.92 |
| Al$_2$O$_3$ | | 20.2 | 20.9 | 21.0 | 21.4 |
| SiO$_2$ | | 65.8 | 64.8 | 65.0 | 64.8 |
| TiO$_2$ | | 3.02 | 3.14 | 3.05 | 3.20 |
| ZrO$_2$ | | 1.39 | 1.40 | 1.40 | 1.35 |
| P$_2$O$_5$ | | 0.11 | 0.10 | 0.10 | 0.04 |
| SnO$_2$ | | 0.30 | | | 0.24 |
| As$_2$O$_3$ | | | 0.28 | 0.15 | |
| Fe$_2$O$_3$ | | 0.090 | 0.062 | 0.061 | 0.0990 |
| V$_2$O$_5$ | | 0.016 | | | |
| MoO$_3$ | | | 0.150 | 0.150 | 0.1600 |
| MnO$_2$ | | 0.021 | 0.025 | 0.025 | |
| CoO | | 0.027 | | | |
| Addition to batch | % by wt. | | | 0.2% sugar without nitrate | |
| Properties in glass form | | | | | |
| Transformation temperature Tg | ° C. | | | | 675 |
| $10^2$ temperature | ° C. | | | | 1733 |
| Working temperature V$_A$ | ° C. | | | | 1300 |
| UDL temperature | ° C. | | | | 1275 |

TABLE 3-continued

COMPOSITIONS AND PROPERTIES OF CRYSTALLIZABLE GLASSES

| | % by wt. | Glass No. 13 | 14 | 15 |
|---|---|---|---|---|
| Composition | | | | |
| Li$_2$O | | 4.13 | 3.22 | 3.73 |
| Na$_2$O | | 0.64 | 0.78 | 0.78 |
| K$_2$O | | 0.29 | 0.20 | 0.58 |
| MgO | | 0.24 | 0.81 | 0.20 |
| CaO | | 0.52 | 0.21 | 0.21 |
| SrO | | 0.02 | | |
| BaO | | 2.05 | 2.42 | 2.41 |
| ZnO | | | 1.16 | 0.93 |
| Al$_2$O$_3$ | | 21.7 | 19.8 | 20.0 |
| SiO$_2$ | | 65.8 | 66.9 | 66.4 |
| TiO$_2$ | | 3.58 | 2.68 | 2.83 |
| ZrO$_2$ | | 0.64 | 1.44 | 1.40 |
| P$_2$O$_5$ | | 0.03 | | |
| SnO$_2$ | | 0.25 | 0.20 | 0.39 |
| As$_2$O$_3$ | | | | |
| Fe$_2$O$_3$ | | 0.065 | 0.110 | 0.033 |
| V$_2$O$_5$ | | | | |
| MoO$_3$ | | 0.026 | 0.043 | 0.045 |
| MnO$_2$ | | | | |
| CoO | | | | |
| Addition to batch | | | | 0.2% Sugar without nitrate |
| Properties in glass form | | | | |
| Transformation temperature Tg | ° C. | 685 | 680 | 674 |
| $10^2$ temperature | ° C. | 1774 | 1770 | 1770 |
| Working temperature V$_A$ | ° C. | 1327 | 1331 | 1331 |
| UDL temperature | ° C. | 1255 | 1260 | |

TABLE 4

PROPERTIES OF INVENTIVE GLASS CERAMICS AND COMPARATIVE GLASS CERAMIC OF EXAMPLE 12

| Example No. | | 12 | 13 | 14 | 15 | 16 |
|---|---|---|---|---|---|---|
| Glass No. | | 9 | 10 | 11 | 12 | 12 |
| Ceramization | # | 2 | 1 | 1 | 1 | 2 |
| Properties in ceramized form | | | | | | |
| Transmission, thickness 4 mm | | | | | | |
| 470 nm | % | 1.9 | 43.4 | 39.4 | 5.8 | 5.2 |
| 630 nm | % | 10.8 | 57.1 | 52.3 | 8.3 | 7.0 |
| 950 nm | % | 72.0 | 82.2 | 83.1 | 53.4 | 50.9 |
| 1600 nm | % | 67.5 | 82.9 | 82.8 | 69.1 | 68.1 |
| 3700 nm | % | 49.4 | 53.6 | 52.0 | 46.3 | 46.4 |

TABLE 4-continued

| | | | | | | |
|---|---|---|---|---|---|---|
| Colour coordinates (CIE) in transmission | | | | | | |
| x | | 0.476 | 0.342 | 0.342 | 0.344 | 0.338 |
| y | | 0.322 | 0.355 | 0.351 | 0.325 | 0.320 |
| Y | % | 3.5 | 48.7 | 43.7 | 5.9 | 5.0 |
| Colour distance d | | 0.163 | 0.024 | 0.037 | 0.032 | 0.027 |
| Colour coordinates (CIELAB) in reflectance | | | | | | |
| L* | | | 29.38 | | | |
| a* | | | 0.46 | | | |
| b* | | | 0.78 | | | |
| c* | | | 0.91 | | | |
| ΔE | | | 31.01 | | | |
| Flatness | nm | 8.0 | 1.3 | 1.3 | 1.6 | 1.6 |
| transmission (wavelength at max./min.) | | 630/504 | 630/470 | 630/470 | 630/527 | 630/536 |
| Scatter, thickness 4 mm, D65 standard light, 2° | | | | | | |
| Visual assessment | | 1 | 1 | 1 | 1 | 1 |
| Haze | % | | 2.0 | 1.4 | 0.6 | 3.4 |
| Thermal expansion [$10^{-6}$/K] | | | | | | |
| CTE $\alpha_{20/300}$ | | −0.40 | −0.24 | −0.27 | 0.05 | 0.00 |
| CTE $\alpha_{20/700}$ | | −0.03 | 0.16 | 0.12 | 0.34 | 0.27 |
| X-ray diffraction | | | | | | |
| Main crystal phase | | HQMC | HQMC | HQMC | HQMC | HQMC |

PROPERTIES OF INVENTIVE GLASS CERAMICS

| | | | | |
|---|---|---|---|---|
| Example No. | | 17 | 18 | 19 |
| Glass No. | | 13 | 14 | 15 |
| Ceramization | # | 1 | 2 | 2 |
| Properties in ceramized form | | | | |
| Transmission, thickness 4 mm, D65 standard light, 2° | | | | |
| 470 nm | % | 12.1 | 33.2 | 12.5 |
| 630 nm | % | 27.4 | 46.1 | 10.8 |
| 950 nm | % | 54.0 | 71.6 | 51.8 |
| 1600 nm | % | 72.1 | 72.3 | 82.7 |
| 3700 nm | % | 49.9 | 46.1 | 47.0 |
| Colour coordinates (CIE) in transmission | | | | |
| x | | 0.389 | 0.342 | 0.302 |
| y | | 0.385 | 0.348 | 0.313 |
| Y | % | 19.6 | 38.5 | 10.3 |
| Colour distance d | | 0.095 | 0.035 | 0.019 |
| Flatness | nm | 2.3 | 1.4 | 1.3 |
| transmission (wavelength at max./min.) | | 630/470 | 630/470 | 470/575 |
| Scatter, thickness 4 mm, D65 standard light, 2° | | | | |
| Visual assessment | | 2 | 1 | 1 |
| Haze | % | | 1.1 | 1.1 |
| Thermal expansion | | | | |
| CTE $\alpha_{20/300}$ | $10^{-6}$/K | −0.37 | 0.32 | −0.14 |
| CTE $\alpha_{20/700}$ | $10^{-6}$/K | 0.01 | 0.59 | 0.26 |
| X-ray diffraction | | | | |
| Main crystal phase | | HQMC | HQMC | HQMC |

TABLE 5

EXAMPLES OF SUITABLE COATINGS AND COMPARATIVE EXAMPLE ON TRANSPARENT NON-COLOURED GLASS CERAMICS OF THE CERAN ® CLEARTRANS TYPE.

| | | No. | | |
|---|---|---|---|---|
| | | B1 | B2 | B3 |
| Type | | Spinel | Spinel + compensation layer | Cermet |
| Material | | CoFeMnCr | CoFeMnCr + SiOxNy | MoSiOx |
| Mo | | — | — | 32 |
| Si | | — | — | 68 |
| Colour | | blue | black | black |
| Colour coordinates (CIExyY) in transmission | | | | |
| x | | 0.39 | 0.387 | 0.368 |
| y | | 0.39 | 0.378 | 0.374 |
| Y | % | 37.6 | 33.2 | 32.8 |
| Colour coordinates (CIELAB) in reflectance | | | | |
| L* | | 29.79 | 30.48 | 27.1 |
| a* | | 1.86 | −0.75 | 0.4 |
| b* | | −17.95 | 0.57 | 1.2 |
| c | | 18.05 | 0.94 | 1.26 |
| Spectral transmittance | | | | |
| 950 nm | % | 59.4 | 67.1 | 65.3 |
| 1600 nm | % | 63.3 | 63.2 | 83.4 |
| 3750 nm | % | 43.6 | 43.5 | 47.3 |
| Haze | % | 0.11 | 0.28 | 0.22 |
| Other properties | | | | |
| R | MΩ/□ | >20 | >20 | >20 |
| Thickness | nm | | 200 + 45 | |

TABLE 6

FURTHER EXAMPLES OF SUITABLE COATINGS ON TRANSPARENT NON-COLOURED GLASS CERAMICS.

| | | No. | | |
|---|---|---|---|---|
| | | B4 | B5 | B6 |
| Type | | Cermet | Cermet | Cermet |
| Material | | MoSiOx | MoSiOx | MoSiOx |
| Mo | | 32 | 22 | 32 |
| Si | | 68 | 78 | 68 |
| Colour | | black | black | black |
| Colour coordinates (CIELAB) in reflectance | | | | |
| L* | | 27.1 | 27.2 | 26.9 |
| a* | | 0.4 | −0.8 | 0.6 |
| b* | | 1.2 | 1.4 | 1 |
| Colour coordinates (CIExyY) in transmission | | | | |
| x | | 0.368 | 0.37 | 0.37 |
| y | | 0.374 | 0.37 | 0.37 |
| Y | % | 32.8 | 29.5 | 32.0 |
| Transmission | | | | |
| 470 nm | % | | 20.2 | 21.8 |
| 630 nm | % | | 38.4 | 41.3 |
| 950 nm | % | 65.3 | 59.8 | 65.1 |
| 1600 nm | % | 83.4 | 80.2 | 82.2 |
| 3750 nm | % | 47.3 | 47 | 46.9 |
| Haze | % | 0.22 | 0.2 | 0.2 |
| Other properties | | | | |
| R | MΩ/□ | >20 | >20 | >20 |

TABLE 7

FURTHER EXAMPLES OF SUITABLE COATINGS ON TRANSPARENT NON-COLOURED GLASS CERAMICS

| | | No. | | |
|---|---|---|---|---|
| | | B7 | B8 | B9 |
| Type | | Cermet | Cermet | Cermet |
| Material | | MoSiOx | MoSiOx | MoSiOx |
| Mo | | 32 | 32 | 32 |
| Si | | 68 | 68 | 68 |
| Colour | | black | black | black |
| Colour coordinates (CIELAB) in reflectance | | | | |
| L* | | 26.4 | 27.1 | 27.8 |
| a* | | 2.0 | 1.0 | −2.8 |
| b* | | −1.8 | −2.4 | 1.2 |
| Colour coordinates (CIExyY) in transmission | | | | |
| x | | 0.38 | 0.37 | 0.37 |
| y | | 0.39 | 0.38 | 0.38 |
| Y | % | 35.5 | 36.7 | 34.4 |
| Transmission | | | | |
| 470 nm | % | 22.7 | 23.7 | 24.1 |
| 630 nm | % | 45.8 | 45.8 | 44.2 |
| 950 nm | % | 54.9 | 65.1 | 66.1 |
| 1600 nm | % | 79.9 | 81.3 | 80.4 |
| 3750 nm | % | 47.8 | 47.8 | 47.5 |
| Haze | % | 0.3 | 0.3 | 0.3 |
| Other properties | | | | |
| R | MΩ/□ | >20 | >20 | >20 |

What is claimed is:

1. A fitout article or article of equipment for a kitchen or laboratory, comprising:
    an interior;
    a separating element dividing the interior from an exterior, the separating element having a light transmittance of at least 5% and of at most 70%;
    a display device in the interior such that light emitted by the display device passes through the separating element to the exterior; and
    a covering on a side of the separating element facing the interior, the covering has a cutout that overlaps with the separating element, the covering has a light transmittance of at most 7%,
    wherein the separating element comprises a glass or glass ceramic substrate having a coefficient of thermal expansion of $-6 \times 10^{-6}/K$ to $6 \times 10^{-6}/K$ in a temperature range between 20° C. and 300° C.,
    wherein the covering has a colour locus in the CIELAB colour space with coordinates L* of 20 to 40, a* of −6 to 6 and b* of −6 to 6, measured in reflectance with D65 standard illuminant light against a black trap in transmission through the glass or glass ceramic substrate, wherein the fitout article or article of equipment has a colour locus of D65 standard illuminant light, after passing through the glass or glass ceramic substrate in a region of the cutout, is within a white region W1 determined in a chromaticity diagram CIExyY-2° by coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29. |

2. The fitout article or article of equipment of claim 1, wherein the fitout article or article of equipment does not include a black-body compensation filter.

3. The fitout article or article of equipment of claim 1, wherein the light transmittance of the covering is at most 1%.

4. The fitout article or article of equipment of claim 1, wherein the separating element in the region of the cutout has a transmission at a wavelength of 1600 nm of at least 30%.

5. The fitout article or article of equipment of claim 1, wherein the separating element in the region of the cutout has a transmission at at least a wavelength in the range between 850 nm and 1000 nm of at least 3%.

6. The fitout article or article of equipment of claim 1, wherein the separating element in the region of the cutout has a transmission at at least a wavelength in the range between 3.25 μm and 4.25 μm of at least 10%.

7. The fitout article or article of equipment of claim 1, wherein the glass or glass ceramic substrate is a glass ceramic substrate, the coefficient of thermal expansion of the glass ceramic substrate is between 20 and 300° C. of −2.5 to 2.5×10−6/K.

8. The fitout article or article of equipment of claim 1, wherein the glass or glass ceramic substrate is a glass substrate, the coefficient of thermal expansion of the glass substrate between 20 and 300° C. is 3.5 to 6×10−6/K, the glass substrate having a glass transition temperature of 500 to 650° C.

9. The fitout article or article of equipment of claim 1, wherein the light transmittance of the separating element is at least 9% and of at most 55%.

10. The fitout article or article of equipment of claim 1, wherein the colour locus in the CIELAB colour space of the covering has the coordinates of 22≤L*≤35, with −4≤a*≤4, and with −4≤b*≤4.

11. The fitout article or article of equipment of claim 1, further comprising a coating on the separating element, wherein the coating comprises a material system selected from a group consisting of: spinels, cermets, carbides, and carbonitrides.

12. The fitout article or article of equipment of claim 1, wherein the glass or glass ceramic substrate comprises a material selected from a group consisting of: 0.003-0.5% by weight of MoO3, less than 0.2% by weight of Nd2O3, less than 0.015% by weight of V2O5, and any combinations thereof.

13. The fitout article or article of equipment of claim 1, further comprising a difference between a percentage grey value in the region of the cutout when the display device is off and a percentage grey value in the region without the cutout, wherein the difference is less than 5.0%.

14. The fitout article or article of equipment of claim 1, wherein the separating element in the region of the cutout has a haze of at most 5%.

15. The fitout article or article of equipment of claim 1, wherein the separating element in the region of the cutout has a clarity of at least 90%.

16. The fitout article or article of equipment of claim 1, wherein the display device is a display selected from a group consisting of: an LCD display, an OLED display, and a video projector.

17. The fitout article or article of equipment of claim 1, wherein the fitout article or article of equipment is configured for a use selected from a group consisting of: a cooking table, a laboratory table, a kitchen cabinet, a kitchen appliance, a cooking appliance, a baking oven, a microwave device, a refrigerator, a grill, a steam cooker, a toaster, and an extractor hood.

18. The fitout article or article of equipment of claim 1, wherein the separating element is configured for a use selected from a group consisting of: a table surface, a cooking table surface, a laboratory table surface, a kitchen working surface, a cooktop, a baking oven door, a microwave oven door, an item of furniture, a part of a front of a door, and a part of a drawer.

19. The fitout article or article of equipment of claim 1, wherein the covering is selected from a group consisting of: a coating, a self-supporting carrier material, a sheet, a film of glass, a glass ceramic, a plastic material, an insulation material, and any combination thereof.

* * * * *